(12) United States Patent
Yum et al.

(10) Patent No.: US 12,426,108 B2
(45) Date of Patent: *Sep. 23, 2025

(54) METHOD OF AND APPARATUS FOR TRANSMITTING DATA BASED ON CHANNEL STATE IN DEVICE-TO-DEVICE COMMUNICATION

(71) Applicant: SAMSUNG ELECTRONICS CO., LTD., Suwon-si (KR)

(72) Inventors: Kunil Yum, Seoul (KR); Yangsoo Kwon, Seoul (KR); Jungmin Park, Seoul (KR); Junho Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,598

(22) Filed: Dec. 19, 2023

(65) Prior Publication Data

US 2024/0121841 A1 Apr. 11, 2024

Related U.S. Application Data

(63) Continuation of application No. 17/187,052, filed on Feb. 26, 2021, now Pat. No. 11,895,718.

(30) Foreign Application Priority Data

Aug. 25, 2020 (KR) .................. 10-2020-0107403

(51) Int. Cl.
*H04W 76/14* (2018.01)
*H04B 7/01* (2006.01)
(Continued)

(52) U.S. Cl.
CPC .............. *H04W 76/14* (2018.02); *H04B 7/01* (2013.01); *H04B 7/0626* (2013.01);
(Continued)

(58) Field of Classification Search
CPC ..... H04W 76/14; H04W 24/10; H04W 72/51; H04B 7/01; H04B 7/0626; H04L 1/0003
See application file for complete search history.

(56) References Cited

U.S. PATENT DOCUMENTS 8,654,822 B2    2/2014   Kim et al.
9,203,590 B2   12/2015   Ren et al.
(Continued)

FOREIGN PATENT DOCUMENTS

CN   108834433 A   11/2018
CN   109644022 A   4/2019
(Continued)

OTHER PUBLICATIONS

3rd Generation Partnership Project; Technical Specification Group Radio Access Network; NR; Study on NR Vehicle-to-Everything (V2X) (Release 16); 3GPP TR 38.885, V16.0.0, Mar. 2019, pp. 1-122.
(Continued)

*Primary Examiner* — Deepa Belur
(74) *Attorney, Agent, or Firm* — Sughrue Mion, PLLC

(57) ABSTRACT

A method of performing device-to-device (D2D) communication by a first device includes obtaining at least one measurement value corresponding to a relative velocity between the first device and a second device; adjusting at least one transmission parameter based on the at least one measurement value; providing the adjusted at least one transmission parameter to the second device; and transmitting data to the second device based on the adjusted at least one transmission parameter.

20 Claims, 29 Drawing Sheets

Related U.S. Application Data

(60) Provisional application No. 62/982,357, filed on Feb. 27, 2020.

(51) Int. Cl.
*H04B 7/06* (2006.01)
*H04L 1/00* (2006.01)
*H04W 24/10* (2009.01)
*H04W 72/51* (2023.01)

(52) U.S. Cl.
CPC .......... *H04L 1/0003* (2013.01); *H04W 24/10* (2013.01); *H04W 72/51* (2023.01)

(56) References Cited

U.S. PATENT DOCUMENTS

| | | | |
|---|---|---|---|
| 10,321,353 | B2 | 6/2019 | Kim et al. |
| 10,356,564 | B2 | 7/2019 | Xu et al. |
| 10,461,831 | B2 | 10/2019 | Park et al. |
| 10,491,354 | B2 | 11/2019 | Kim et al. |
| 11,251,893 | B2 | 2/2022 | Abedini et al. |
| 11,343,658 | B2 | 5/2022 | Wang et al. |
| 2008/0318613 | A1 | 12/2008 | Balachandran et al. |
| 2012/0190309 | A1 | 7/2012 | Tang |
| 2014/0254401 | A1 | 9/2014 | Talwar et al. |
| 2016/0226649 | A1* | 8/2016 | Papasakellariou .... H04L 5/0057 |
| 2018/0227035 | A1 | 8/2018 | Cheng et al. |
| 2019/0319723 | A1 | 10/2019 | Axmon et al. |
| 2020/0007247 | A1 | 1/2020 | Gulati et al. |
| 2020/0028657 | A1* | 1/2020 | Bharadwaj ........... H04B 7/0486 |
| 2020/0112359 | A1* | 4/2020 | Park ...................... H04L 5/0053 |
| 2020/0329352 | A1* | 10/2020 | Wang ...................... H04L 67/12 |
| 2021/0051681 | A1* | 2/2021 | Manolakos ........... H04L 1/0031 |
| 2021/0100046 | A1* | 4/2021 | Nguyen ................ H04L 5/0058 |
| 2021/0203455 | A1 | 7/2021 | Zhang et al. |
| 2021/0367732 | A1* | 11/2021 | Salim .................... H04L 5/0044 |
| 2022/0104178 | A1 | 3/2022 | Lee et al. |
| 2022/0140178 | A1* | 5/2022 | Yang .................... H10F 77/311 438/96 |
| 2022/0158708 | A1 | 5/2022 | Zhang |
| 2022/0159674 | A1 | 5/2022 | Deng et al. |
| 2023/0090593 | A1 | 3/2023 | Kim |
| 2024/0414030 | A1* | 12/2024 | Penna ................ H04L 25/0204 |

FOREIGN PATENT DOCUMENTS

| | | | |
|---|---|---|---|
| CN | 110166976 | A | 8/2019 |
| EP | 3 731 492 | A1 | 10/2020 |
| EP | 3829123 | A1 | 6/2021 |
| KR | 10-2009-0019416 | A | 2/2009 |
| KR | 101173663 | B1 | 8/2012 |
| WO | 2017/052453 | A1 | 3/2017 |
| WO | 2019/153935 | A1 | 8/2019 |
| WO | 2020/021640 | A1 | 1/2020 |
| WO | WO-2021108653 | A1 * | 6/2021 .......... H04L 1/1854 |

OTHER PUBLICATIONS

5G; NR; Physical channels and modulation (3GPP TS 38.211 version 15.2.0 Release 15), ETSI TS 138 211 V15.2.0, Jul. 2018, pp. 1-97 (98 pages).

Communication dated Jul. 1, 2021, issued by the European Patent Office in counterpart European Application No. 21155973.7.

Communication issued on Jan. 27, 2023 by the European Patent Office in corresponding European Patent Application No. 21155973.7.

LTE; Evolved Universal Terrestrial Radio Access (E-UTRA); Physical channels and modulation (3GPP TS 36.211 version 15.3.0 Release 15); ETSI TS 136 211 V15.3.0, Oct. 2018, pp. 1-238 (239 pages).

ZTE, "Discussion on support of 64QAM over sidelink," R2-1713080, 3GPP TSG-RAN WG2 Meeting #100, Reno, USA, Nov. 27-Dec. 1, 2017, Total 3 pages.

Communication issued on Feb. 14, 2024 by the European Patent Office in European Patent Application No. 21155973.7.

Communication dated Jan. 21, 2025 issued by the China National Intellectual Property Administration in Chinese Patent Application No. 202110219120.0.

Communication dated Aug. 19, 2025, issued by the Korean Intellectual Property Office in Korean Application No. 10-2020-0107403.

Huawei et al., "Discussion on reference signal design for sidelink control and data channel", Jan. 21, 2019, 3GPP TSG RAN WG1 Ad-Hoc Meeting 1901, R1-1900024 (7 pages total).

* cited by examiner

FIG. 7

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| ... | ... | ... | ... | ... | ... | ... | ... | ... |

| μ | Δf = 2^μ·15[kHz] | Y [symbol] |
|---|---|---|
| 0 | 15 | 1 |
| 1 | 30 | 1 |
| 2 | 60 | 1 |
| 3 | 120 | 2 |

FIG. 11A

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | | reserved | 1 |
| 30 | | | 2 |
| 31 | | | 3 |

FIG. 11B

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 12

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 13A
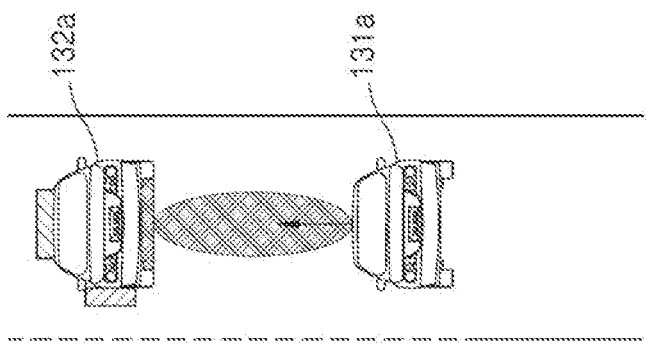
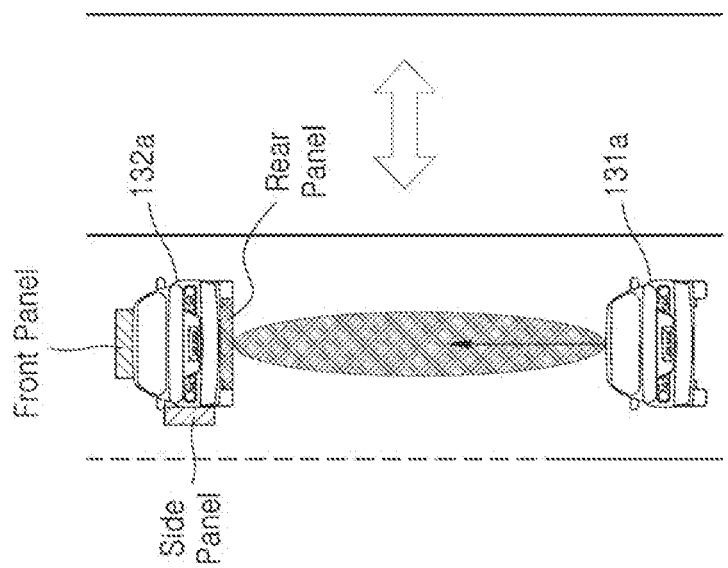

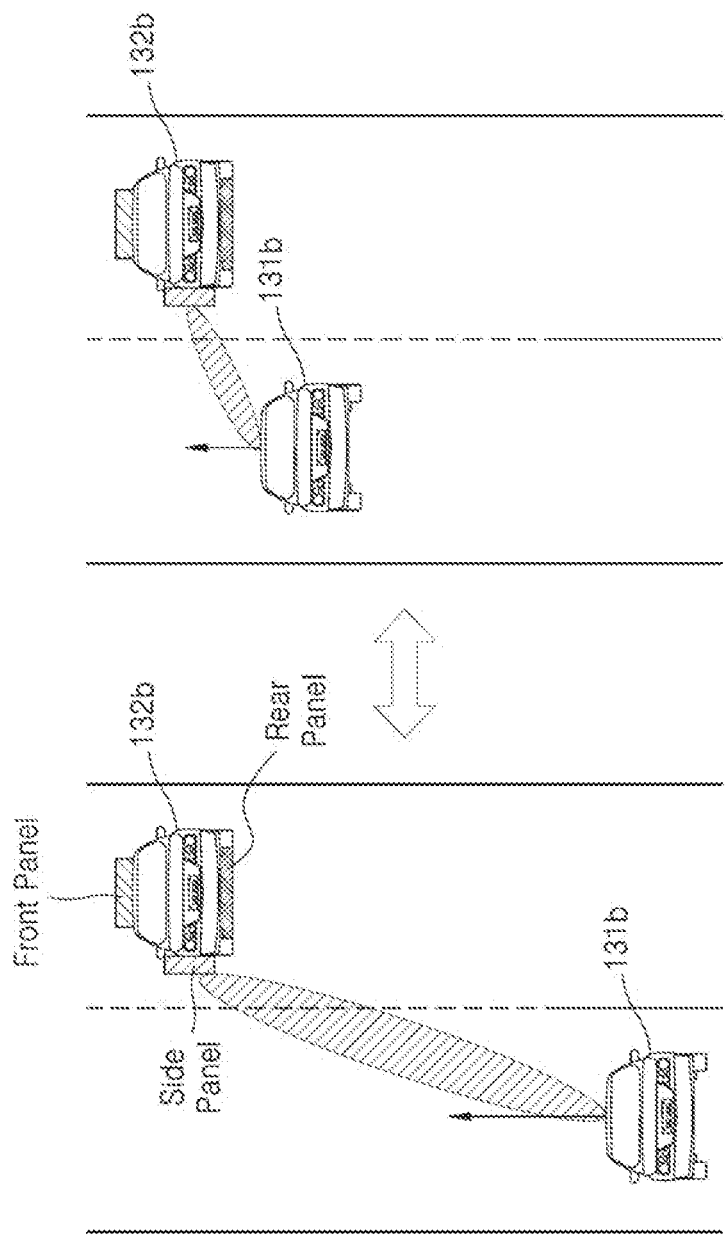

FIG. 16A

| TPMI index | W (ordered from left to right in increasing order of TPMI index) | | | | | | | |
|---|---|---|---|---|---|---|---|---|
| 0 - 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | - | - |

FIG. 16B

| TPMI index | W (ordered from left to right in increasing order of TPMI index) | | | |
|---|---|---|---|---|
| 0 - 2 | $\frac{1}{\sqrt{2}}\begin{bmatrix}1&0\\0&1\end{bmatrix}$ | $\frac{1}{2}\begin{bmatrix}1&1\\1&-1\end{bmatrix}$ | $\frac{1}{2}\begin{bmatrix}1&1\\j&-j\end{bmatrix}$ | |

FIG. 17

| Codebook index | Number of layers | |
|---|---|---|
| | v=1 | v=2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | - |
| 2 | $\frac{1}{\sqrt{2}}\begin{bmatrix}1\\j\end{bmatrix}$ | - |
| 3 | $\frac{1}{\sqrt{2}}\begin{bmatrix}1\\-j\end{bmatrix}$ | - |
| 4 | $\frac{1}{\sqrt{2}}\begin{bmatrix}1\\0\end{bmatrix}$ | - |
| 5 | $\frac{1}{\sqrt{2}}\begin{bmatrix}0\\1\end{bmatrix}$ | - |

FIG. 18A

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 18B

| CQI index | modulation | code rate x 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 18C

| CQI index | modulation | code rate x 1024 | efficiency |
|---|---|---|---|
| 0 | out of range | | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

FIG. 18D

| CQI index | modulation | code rate x 1024 x $R^{csi}$ | efficiency x $R^{csi}$ |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

FIG. 18E

| CQI index | modulation | code rate x 1024 | repetition |
|---|---|---|---|
| 0 | out of range | | |
| 1 | QPSK | 56 | 32 |
| 2 | QPSK | 207 | 16 |
| 3 | QPSK | 266 | 4 |
| 4 | QPSK | 195 | 2 |
| 5 | QPSK | 142 | 1 |
| 6 | QPSK | 266 | 1 |
| 7 | QPSK | 453 | 1 |
| 8 | QPSK | 637 | 1 |
| 9 | 16QAM | 423 | 1 |
| 10 | 16QAM | 557 | 1 |
| 11 | 16QAM | 696 | 1 |
| 12 | 16QAM | 845 | 1 |
| 13 | 64QAM | 651 | 1 |
| 14 | 64QAM | 780 | 1 |
| 15 | 64QAM | 888 | 1 |

METHOD OF AND APPARATUS FOR TRANSMITTING DATA BASED ON CHANNEL STATE IN DEVICE-TO-DEVICE COMMUNICATION

CROSS-REFERENCE TO RELATED APPLICATIONS

This application is a continuation of U.S. application Ser. No. 17/187,052 filed on Feb. 26, 2021, which is based on and claims the benefit of U.S. Provisional Application No. 62/982,357, filed on Feb. 27, 2020, in the U.S. Patent and Trademark Office, and Korean Patent Application No. 10-2020-0107403, filed on Aug. 25, 2020, in the Korean Intellectual Property Office, the disclosures of which are incorporated by reference herein in their entireties.

BACKGROUND

The present disclosure relates to wireless communications, and particularly, to a method and apparatus for transmitting data based on a channel state in device-to-device (D2D) communication.

In D2D communication, terminals communicate with each other through a sidelink, and the sidelink may denote a communication method wherein terminals directly transmit and receive voice or data without using a base station. A method of achieving a high data rate in D2D communication is needed due to an increase in data traffic needed for a sidelink as well as an uplink and a downlink between a base station and a terminal.

SUMMARY

Example embodiments provide a method and apparatus for performing device-to-device (D2D) communication having a high data rate.

According to an aspect of an example embodiment, there is provided a method of performing device-to-device (D2D) communication by a first device, the method including obtaining at least one measurement value corresponding to a relative velocity between the first device and a second device; adjusting at least one transmission parameter based on the at least one measurement value; providing the adjusted at least one transmission parameter to the second device; and transmitting data to the second device based on the adjusted at least one transmission parameter.

According to another aspect of an example embodiment, there is provided a method of performing device-to-device (D2D) communication by a second device, the method including: receiving, from a first device, at least one transmission parameter adjusted by the first device based on a relative velocity between the first device and the second device; and receiving data from the first device based on the at least one transmission parameter received from the first device.

According to another aspect of an example embodiment, there is provided a first device configured to perform device-to-device (D2D) communication with a second device, the first device including at least one transceiver; and at least one processor configured to process a first signal received from the second device through the at least one transceiver and to generate a second signal which is to be transmitted to the second device through the at least one transceiver, wherein the at least one processor is further configured to: obtain at least one measurement value corresponding to a relative velocity between the first device and the second device, adjust at least one transmission parameter based on the at least one measurement value, provide the adjusted at least one transmission parameter to the second device through the at least one transceiver, and generate the second signal based on the adjusted at least one transmission parameter.

According to another aspect of an example embodiment, there is provided a second device configured to perform device-to-device (D2D) communication with a first device, the second device including at least one transceiver; and at least one processor configured to generate a first signal, which is to be transmitted to the first device through the at least one transceiver, and to process a second signal received from the first device through the at least one transceiver, wherein the at least one processor is further configured to receive, through the at least one transceiver, at least one transmission parameter adjusted by the first device based on a relative velocity between the first device and the second device, and process the second signal based on the at least one transmission parameter received from the first device.

BRIEF DESCRIPTION OF THE DRAWINGS

The above and other aspects will be more clearly understood from the following detailed description of example embodiments taken in conjunction with the accompanying drawings in which:

FIG. 7 is a diagram showing an SRS bandwidth configuration table according to an example embodiment;

FIGS. 11A and 11B show examples of a table referred to determining a transmission parameter, according to example embodiments;

FIG. 12 shows examples of a table referred to determining a transmission parameter, according to an example embodiment;

FIGS. 13A and 13B are diagrams illustrating examples of terminals communicating with each other, according to example embodiments;

FIGS. 16A, 16B, and 17 are flowcharts illustrating examples of a table referred to reporting channel state information (CSI), according to example embodiments;

FIGS. 18A to 18E are diagrams illustrating examples of a table referred to reporting CSI, according to example embodiments;

DETAILED DESCRIPTION

As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Figure 1:
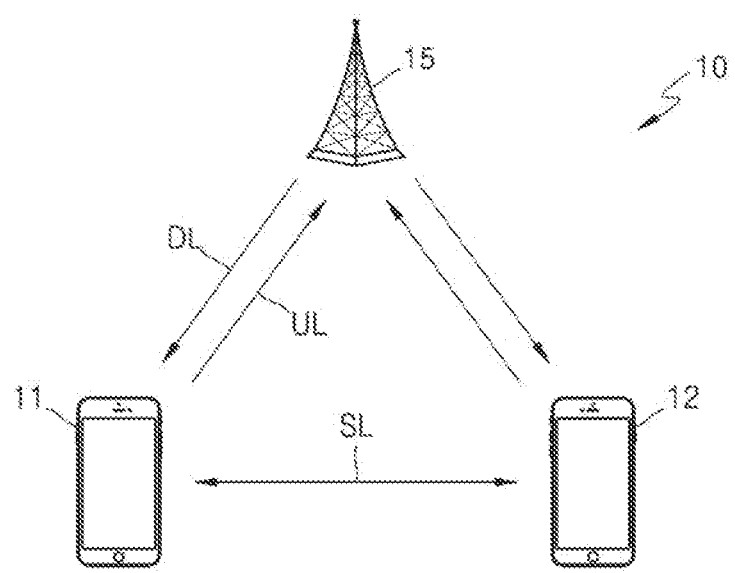
FIG. 1 is a diagram illustrating a wireless communication system according to an example embodiment.

FIG. 1 is a diagram illustrating a wireless communication system 10 according to an example embodiment. The wireless communication system 10 may be referred to as a radio access technology (RAT) system, and in a non-limiting embodiment, may include an arbitrary wireless communication system based on multiple access such as code division multiple access (CDMA), frequency division multiple access (FDMA), time division multiple access (TDMA), orthogonal frequency division multiple access (OFDMA), or single carrier frequency division multiple access (SC-FDMA). For example, 3' Generation Partnership Project (3GPP) long term evolution (LTE) may use OFDMA in a downlink (DL) and may use SC-FDMA in an uplink (UL), and LTE-advanced (LTE-A) may correspond to an advanced version of 3GPP LTE. Also, 5th generation wireless (5G) new radio (NR) has been proposed subsequently to LTE-A, for high performance and short delay and may use all available spectrum resources such as a low frequency band of less than 1 GHz, an intermediate frequency band of 1 GHz to 10 GHz, and a high frequency (millimeter wave) band of 24 GHz or more. Hereinafter, the wireless communication system 10 may be assumed to be LTE-A and/or 5G NR, but it may be understood that embodiments are not limited thereto.

A base station 15 may denote a fixed station which communicates with a first terminal 11 or a second terminal 12 and/or another base station and may communicate with the first terminal 11 or the second terminal 12 and/or the other base station to exchange data and control information. For example, the base station 15 may be referred to as node B, evolved-node B (eNB), next generation node B (gNB), a sector, a site, a base transceiver system (BTS), an access point (AP), a relay node, a remote radio head (RRH), or a radio unit (RU). Herein, the base station 15 or a cell may be construed as a comprehensive meaning which represents a function or a partial area covered by a base station controller (BSC) in CDMA, node-B in WCDMA, eNB in LTE, and a sector (a site) or gNB in 5G NR, and may cover various coverage areas such as a mega-cell, a macro-cell, a micro-cell, a pico-cell, a femtocell, a relay node, an RRH, an RU, a small cell communication range.

The first terminal 11 and the second terminal 12 may be fixed or may have mobility, and may denote arbitrary devices for communicating with the base station 15 to transmit and receive data and/or control information. For example, a terminal may be referred to as user equipment (UE), terminal equipment, a mobile station (MS), a mobile terminal (MT), a user terminal (UT), a subscribe station (SS), a wireless device, or a handheld device. Referring to FIG. 1, the first terminal 11 may communicate with a base station 15 through an uplink UP and a downlink DL and may communicate with a second terminal 12 through a sidelink SL. For example, the first terminal 11 may transmit a signal (referred to as a sidelink signal) to the second terminal 12 by using a certain resource unit in a resource pool corresponding to a series of resources, and the second terminal 12 may detect the signal, transmitted from the first terminal 11, from the resource pool in which the first terminal 11 may transmit signal. When the first terminal 11 is within a range accessible to the base station 15, the base station 15 may inform the first terminal 11 of a resource pool, and when the first terminal 11 is outside the range accessible to the base station 15, the first terminal 11 may receive information about a resource pool from another terminal or may set a resource pool based on a set of predetermined resources. As described below with reference to FIG. 3, a resource pool may include a plurality of resource units, and the first terminal 11 may transmit a signal to the second terminal 12 by using at least one resource unit. Herein, the first terminal 11 transmitting data may be referred to as a first device, and the second terminal 12 receiving the data may be referred to as a second device.

Communication performed between the first terminal 11 and the second terminal 12 through the sidelink SL may be referred to as D2D communication. As an example of D2D communication, vehicle-to-everything (V2X) may denote communication technology where a vehicle exchanges information with another vehicle, a pedestrian, and a thing equipped with infrastructure through the sidelink SL. V2X may denote a terminal which has high mobility and high power performance like vehicles. For example, V2X may include vehicle to base station (V2B), vehicle-to-infrastructure (V2I), vehicle-to-pedestrian (V2P), vehicle to road side unit (V2R), vehicle-to-vehicle (V2V), and vehicle-to-network (V2N) (see "3GPP TS 38.885, NR; Study on Vehicle-to-Everything (Release 16)" (hereafter "Document 1")). In some embodiments, in a case where network equipment such as the base station 15 transmits and receives a signal based on D2D communication, the base station 15 may be regarded as a terminal for D2D communication. A case where the first terminal 11 desires to transmit data to the second terminal 12 (or a case where the second terminal 12 desires to receive the data from the first terminal 11) will be mainly described for example, but embodiments may also be applied to a case where the second terminal 12 desires to receive data from the base station 15 or a road side unit (RSU). Moreover, embodiments will be mainly described with reference to D2D communication, but embodiments may be applied to GSM Edge RAN (GERN) or communication which differs from D2D communication.

As D2D communication needs a high data rate, the first terminal 11 and the second terminal 12 may communicate with each other on the basis of transmission parameters determined based on a channel state. For example, the first terminal 11 may determine transmission parameters based on an estimated channel state and may transmit the determined transmission parameters to the second terminal 12, and then, may transmit data to the second terminal 12. The second terminal 12 may process the signal received from the first terminal 11 based on the transmission parameters provided from the first terminal 11, thereby obtaining data transmitted by the first terminal 11. The sidelink SL may have features which differ from that of the uplink UL and/or the downlink DL, and thus, new methods may be needed for data transmission based on a channel state in D2D communication. Hereinafter, as described below with reference to the drawings, according to example embodiments, the efficient estimation of a channel state may be provided in D2D communication, and thus, an overhead for estimating a channel state may be minimized. Moreover, because various factors are considered, a channel state may be accurately estimated, and thus, optimal transmission parameters may be determined in D2D communication and an optimal data rate may be obtained.

Figure 2:
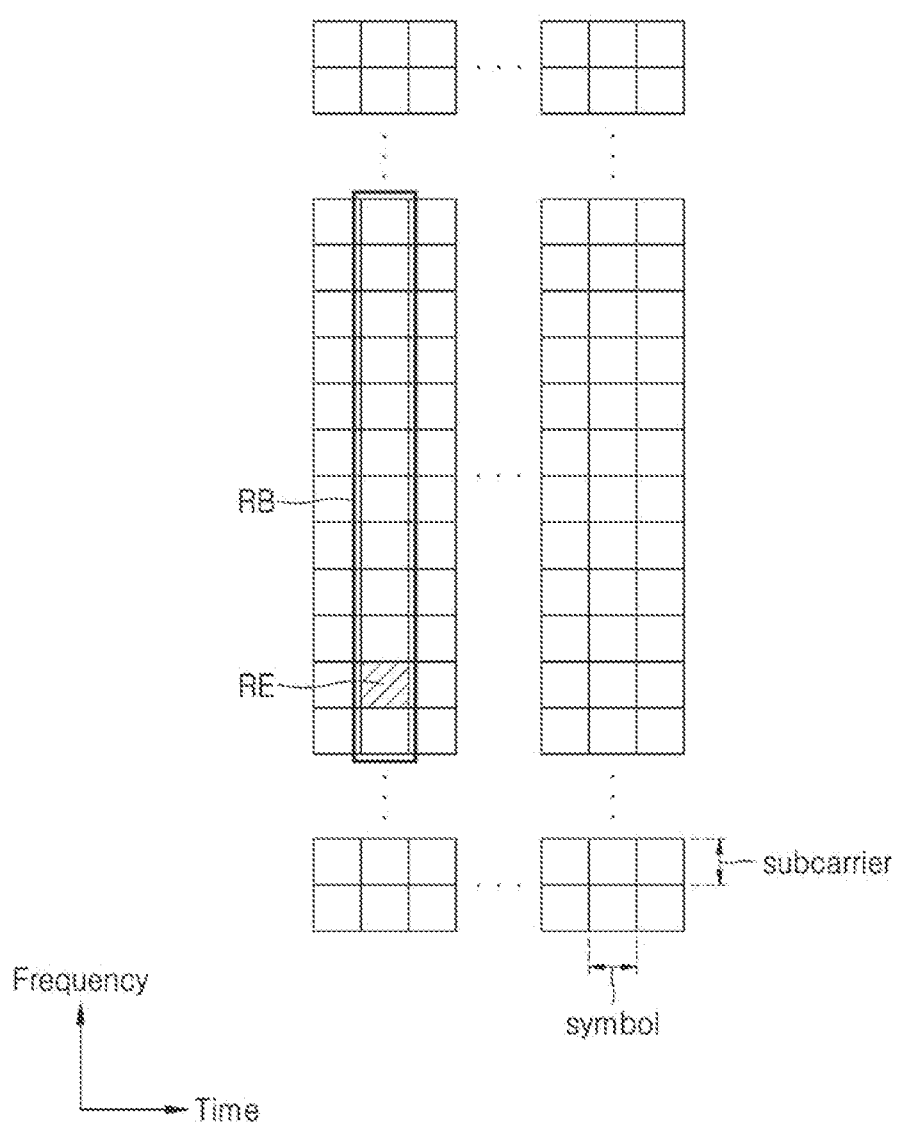
FIG. 2 is a diagram illustrating a slot structure of a wireless frame according to an example embodiment.

FIG. 2 is a diagram illustrating a slot structure of a wireless frame according to an example embodiment. In some embodiments, the slot structure of FIG. 2 may correspond to a slot structure of 5G NR.

Referring to FIG. 2, a slot may include a plurality of symbols (e.g., a plurality of orthogonal frequency division multiple access (OFDM) symbols) with respect to a time axis. For example, one slot in a normal cyclic prefix (CP) may include fourteen symbols, and one slot in an extension CP may include twelve symbols. As another example, one slot in a normal CP may include seven symbols, and one slot in an extension CP may include six symbols.

A carrier may include a plurality of subcarriers (e.g., a maximum of 3,300 subcarriers) with respect to a frequency axis. A resource block RB may correspond to a plurality of continuous subcarriers (e.g., twelve subcarriers) with respect to the frequency axis. A bandwidth part (BWP) may be defined as a plurality of continuous resource blocks (or a plurality of physical resource blocks (PRB)) with respect to the frequency axis and may correspond to one numerology such as subcarrier spacing (SCS), a CP length, etc. A carrier may include a maximum of N (e.g., N is 5) BWPs, and data transmission may be performed based on an activated BWP. One unit in a resource grid may be referred to as a resource element RE, and one complex symbol may be mapped to one resource element.

In some embodiments, a BWP may be defined with respect to a sidelink, and the same sidelink BWP may be used for transmission and reception. For example, the first terminal 11 of FIG. 1 may transmit a sidelink channel and/or a sidelink signal through a certain BWP, and the second terminal 12 may receive the sidelink channel and/or the sidelink signal through a corresponding BWP. In a licensed carrier, a sidelink BWP may be defined independently from an uplink/downlink BWP (i.e., a Uu BWP), and the sidelink BWP may have separate configuration signaling independent from the Uu BWP. For example, the first terminal 11 and/or the second terminal 12 may receive a setting for the sidelink BWP from the base station 15. The sidelink BWP may be previously set for an out-of-coverage terminal and a terminal having an RRC IDLE mode, in a carrier, and in a terminal having an RRC CONNECTED mode, at least one sidelink BWP may be activated in a carrier.

Figure 3:
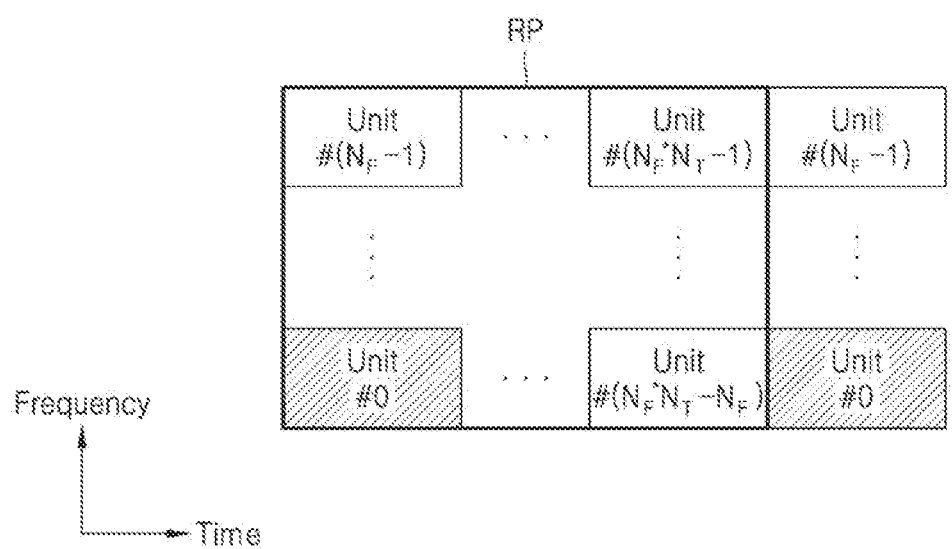
FIG. 3 is a diagram illustrating a resource unit for device-to-device (D2D) communication according to an example embodiment.

FIG. 3 is a diagram illustrating a resource unit for D2D communication according to an example embodiment. Referring to FIG. 3, a total frequency resource of a resource pool RP may be divided into an NF units, and a total time resource of the resource pool RP may be divided into an NT units. Therefore, a total NF*NT number of resource units may be defined in the resource pool RP. FIG. 3 illustrates an example where a resource pool is repeated at a period corresponding to an N T number of sub-frames.

In some embodiments, as illustrated in FIG. 3, one resource unit (e.g., Unit #0) may be periodically repeated and provided. In some embodiments, in a time axis or a frequency axis, in order to obtain a diversity effect, an index of a physical resource unit mapped to one logical resource unit may vary based on a predefined pattern with respect to time. As described above, the resource pool RP may correspond to a set of resource units available by a terminal which desires to transmit a sidelink signal. In some embodiments, the resource pool RP may be divided into a physical sidelink control channel (PSCCH), a physical sidelink shared channel (PSSCH), a physical sidelink discovery channel (PSDCH), a physical sidelink broadcast channel (PSBCH), and a physical sidelink feedback channel (PSFCH) based on content of the sidelink signal.

Figure 4A:
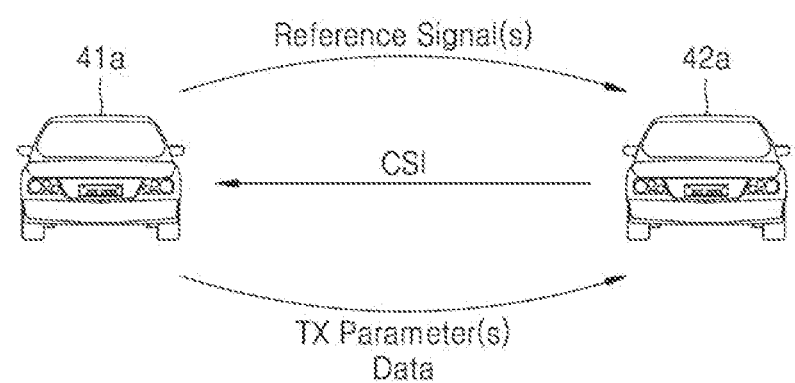
FIGS. 4A and 4B are diagrams illustrating examples of D2D communication according to example embodiments.
Figure 4B:
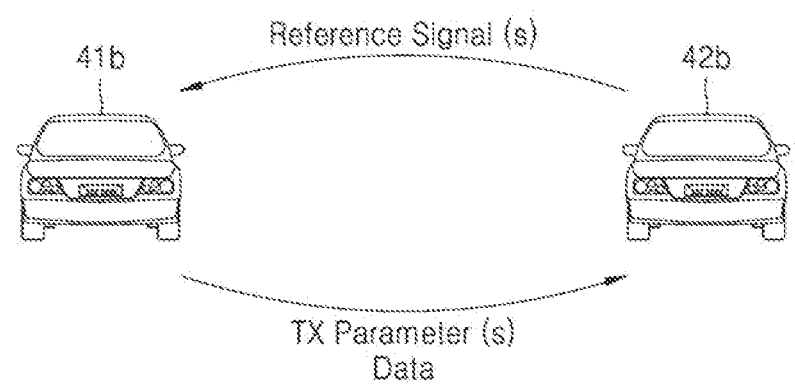

FIGS. 4A and 4B are diagrams illustrating examples of D2D communication according to example embodiments. In detail, FIGS. 4A and 4B illustrate examples of terminals, where vehicles perform D2D communication based on a channel state.

Referring to FIG. 4A, a channel state between a first terminal 41a and a second terminal 42a may be estimated based on CSI feedback. For example, as illustrated in FIG. 4A, the first terminal 41a may transmit at least one reference signal to the second terminal 42a. For example, the first terminal 41a may transmit at least one reference signal for a downlink to the second terminal 42a. The second terminal 42a may receive the at least one reference signal from the first terminal 41a and may estimate a channel state based on the received at least one reference signal, thereby generating channel state information (CSI). For example, the CSI may include at least one of a channel quality indicator (CQI), a rank indicator (RI), a precoding matrix indicator (PMI), a layer indicator (LI), a CSI-RS resource indicator (CRI) and a reference signal received power (L1-RSRP) corresponding thereto, and an SRS resource indicator (SRI) and an L1-RSRP corresponding thereto.

The second terminal 42a may transmit CSI to the first terminal 41a. For example, the second terminal 42a may transmit the CSI to the first terminal 41a through a PSFCH. Transmitting of the CSI to the first terminal 41a from the second terminal 42a may be referred to as CSI feedback or CSI reporting.

In some embodiments, the first terminal 41a may previously select a precoder which is to be used in transmitting data and may transmit, to the second terminal 42a, a reference signal (e.g., a DRMS, a precoded CSI-RS, and a precoded SRS) with the selected precoder applied thereto. The second terminal 42a may assume an identity matrix as a precoder, and based thereon, may calculate CSI (e.g., an RI and/or a CQI). Whether to use the precoded reference signal may be previously defined and/or previously set or instructed to the first terminal 41a and/or the second terminal 42a by higher-layer signaling such as radio resource control (RRC). Moreover, an indicator representing the use or not of the precoded reference signal may be included in (dynamic) control signaling through which aperiodic reference signal triggering is transmitted, and the first terminal 41a and/or the second terminal 42a may identify the use or not of the precoded reference signal based on a corresponding indicator.

In some embodiments, the first terminal 41a may transmit the precoded reference signal so that the precoded reference signal port is a candidate DMRS port in actual transmission, namely, represents a data layer. The first terminal 41a may apply a precoder, applied to each layer among candidate precoders, to different precoded reference signal ports, and the second terminal 42a may select at least one reference signal port index (e.g., to which a precoder desirable for data transmission is applied) and may report the selected at least one reference signal port index to the first terminal 41a. The second terminal 42a may assume that the number of selected and reported reference signal port indexes matches the number of ranks and a channel of each reference signal port is used for each layer transmission and may calculate and report a CQI.

In some embodiments, in a case where a DMRS is transmitted as at least one reference signal, CSI may be reported based on transmission of a precoded reference signal similar to the above description. For example, in a case where the second terminal 42a receives and measures the DMRS, the second terminal 42a may assume that the same precoder is applied to a frequency axis based on a precoding RB group (PRG) size and may estimate a channel state. In a case where a DMRS associated with a PSBCH is received, the PSBCH may be received through only a partial band of a total BWP, and the second terminal 42a may assume that a channel through which the DMRS is received is constant in a total PSSCH band and may report a wideband CSI.

In some embodiments, the second terminal 42a may independently use a measurement result of a slot, which has received a reference signal, in generating CSI and may not apply inter-slot filtering such as average, interpolation, and extrapolation. As described above with reference to FIG. 1, based on the high mobility of a terminal, a channel may quickly vary in V2X, and thus, inter-slot filtering may be excluded since the inter-slot filtering may decrease the accuracy of channel estimation due to a channel state which quickly varies by slot units. For example, regarding time-domain channel measurement restriction, estimation of a channel state in V2X may always be performed like "timeRestrictionForChannelMeasurements=Enable" regardless of a setting of a parameter "timeRestrictionForChannelMeasurements" for preventing an inter-slot channel average in a time domain.

In some embodiments, when time-domain channel measurement restriction such as "timeRestrictionForChannelMeasurements" is deactivated in a low-speed V2X situation, the second terminal 42a may allow an inter-slot channel average in a time domain and may apply, for example, an average, infinite impulse response (IIR) filtering, and interpolation to results obtained by measuring slots, thereby enhancing the accuracy of a measurement result. To this end, the first terminal 41a may not change a precoder applied to the reference signal, or may not apply the precoder to the reference signal.

The first terminal 41a may receive the CSI from the second terminal 42a and may determine at least one transmission (TX) parameter based on the CSI. The transmission parameter may be a parameter for defining a method of transmitting data from the first terminal 41a to the second terminal 42a and may be referred to as a scheduling parameter. For example, the transmission parameter may include at least one of a modulation coding scheme (MCS) index, a precoding index, and a rank index. The first terminal 41a may transmit the determined at least one transmission parameter to the second terminal 42a and may transmit data to the second terminal 42a based on the determined at least one transmission parameter. The second terminal 42a may process a signal received from the first terminal 41a based on the at least one transmission parameter received from the first terminal 41a to obtain data.

Referring to FIG. 4B, a channel state between the first terminal 41b and the second terminal 42b may be estimated based on a reference signal provided from the second terminal 42b, and thus, CSI feedback (or CSI reporting) of FIG. 4A may be omitted. For example, as illustrated in FIG. 4B, the second terminal 42b may transmit at least one reference signal to the first terminal 41b. In some embodiments, the second terminal 42b may transmit, to the first terminal 41b, at least one reference signal for an uplink UL. The first terminal 41b may receive the at least one reference signal from the second terminal 42b.

The first terminal 41b may estimate a channel state based on the received at least one reference signal. For example, the first terminal 41b may estimate a channel state corresponding to transmission from the second terminal 42b to the first terminal 41b based on the at least one reference signal and may estimate a channel state corresponding to transmission from the first terminal 41b to the second terminal 42b based on the reciprocity of an estimated channel. The first terminal 41b may determine at least one transmission parameter based on a finally estimated channel state. The first terminal 41b may transmit the determined at least one transmission parameter to the second terminal 42b and may transmit data to the second terminal 42b based on the determined at least one transmission parameter.

In some embodiments, in FIGS. 4A and 4B, the at least one reference signal may include a reference signal for the uplink UL and/or a downlink DL. For example, the at least one reference signal may include a demodulation reference signal (DMRS) associated with a V2X channel (e.g., a PSFCH, a PSBCH, a PSCCH, and a PSSCH), and moreover, may include a phase tracking reference signal (PT-RS) for a PSSCH in frequency range 2 (FR2). Also, the at least one reference signal may include a channel state information reference signal (CSI-RS), a sounding reference signal (SRS), and an automatic gain control (AGC) training signal. Also, the at least one reference signal may include a sidelink synchronization signal (SLSS), and for example, a primary sidelink synchronous signal (P-SSS) and a secondary sidelink synchronous signal (S-SSS). Embodiments where the first terminal 41a transmits an SRS as at least one reference signal to the second terminal 42a will be described below with reference to FIGS. 5 to 8B.

Herein, D2D communication described above with reference to FIG. 4A may be referred to as a CSI feedback scheme, and D2D communication described above with reference to FIG. 4B may be referred to as a channel reciprocity scheme. Hereinafter, embodiments of D2D communication based on the CSI feedback scheme and/or the channel reciprocity scheme will be described below with reference to FIGS. 4A and 4B.

Figure 5:
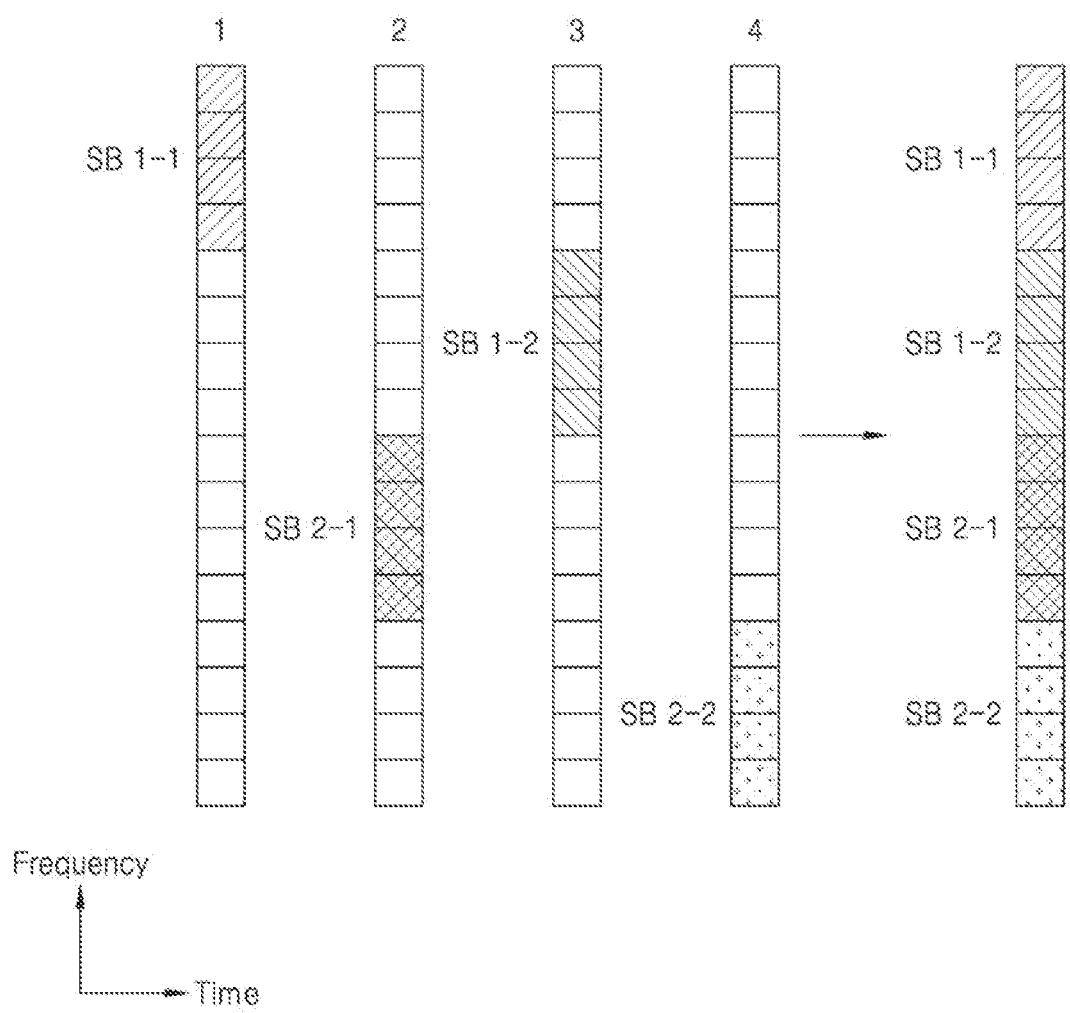
FIG. 5 is a diagram illustrating frequency hopping according to an example embodiment.

FIG. 5 is a diagram illustrating frequency hopping according to an example embodiment. In some embodiments, the second terminal 42b of FIG. 4B may transmit at least one reference signal as an SRS to the first terminal 41b. Hereinafter, FIG. 5 will be described with reference to FIG. 4B.

When frequency hopping is enabled, the first terminal 41b may determine a position of an SRS frequency at a certain time (e.g., a certain slot or a certain symbol) based on a frequency hopping pattern defined in "3GPP TS 36.211, Evolved Universal Terrestrial Radio Access (E-UTRA); Physical channels and modulation (Release 15)" (hereafter "Document 2") and/or "3GPP TS 38.211, NR; Physical channels and modulation (Release 15)" (hereafter "Document 3" and may estimate a channel state at a determined position. In some embodiments, the first terminal 41b may collect SRS subband measurement results after the reception of an SRS is completed in a total BWP thereby estimating the wideband channel. For example, as illustrated in FIG. 5, when a magnitude of a subband is 4 and a magnitude of a wideband is 16, four subband SRSs SB1-1, SB2-1, SB1-2, and SB2-2 may be sequentially received based on a frequency hopping pattern, and thus, the reception of the SRS may be completed in a total wideband.

In a non-limiting embodiment, the first terminal 41b may apply frequency interpolation, such as an inverse fast Fourier transform (IFFT) or a minimum mean square error (MMSE), to the SRS subband measurement results to estimate a wideband channel. Also, the first terminal 41b may apply the same or different weight values to subbands with respect to a frequency axis and may calculate an average, and moreover, the first terminal 41b may decrease pollution of channel estimation based on an undesired previous measurement result. The first terminal 41b may perform time/frequency filtering to extract a signal of a desired band from a measured result H and may obtain an estimated channel Ĥ by applying time/frequency interpolation/extrapolation or schemes similar thereto.

Figure 6:
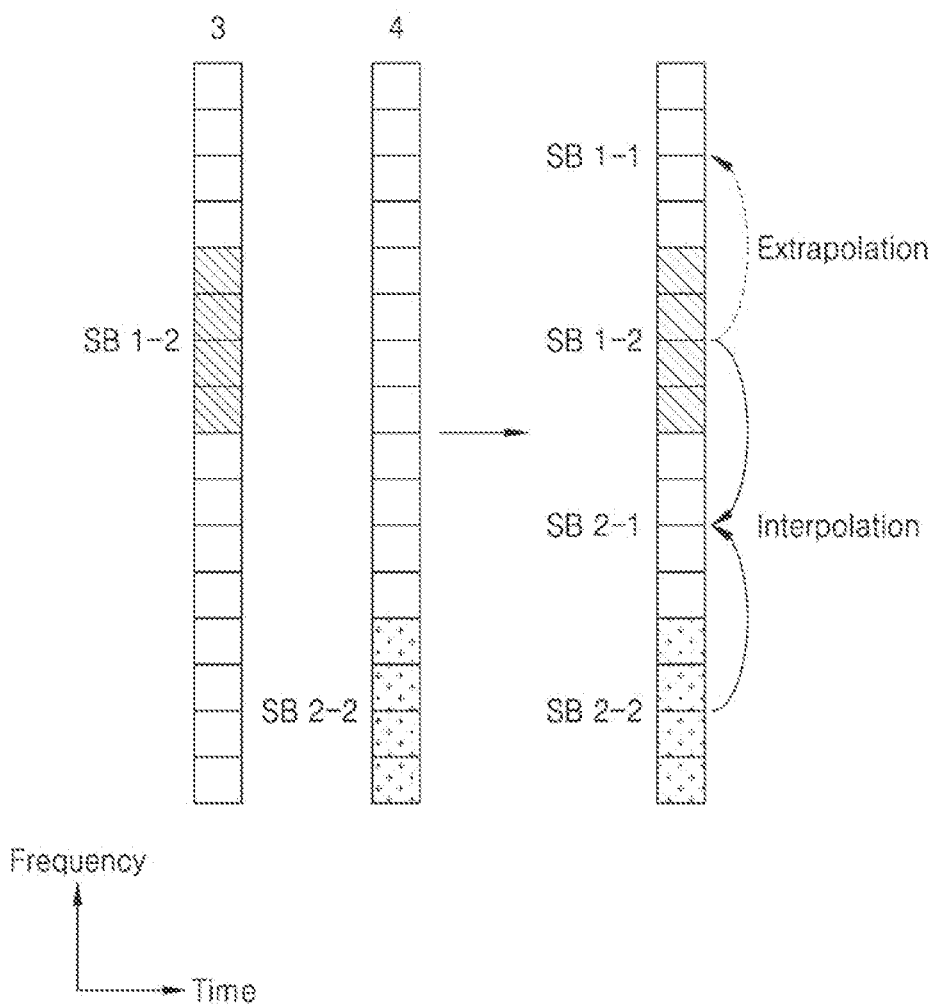
FIG. 6 is a diagram illustrating an operation of estimating a wideband channel from partial sounding reference signal (SRS) transmission according to an example embodiment.

FIG. 6 is a diagram illustrating an operation of estimating a wideband channel from partial SRS transmission according to an example embodiment, and FIG. 7 is a diagram showing an SRS bandwidth configuration table according to an example embodiment. As described above with reference to FIG. 5, the second terminal 42b of FIG. 4B may transmit an SRS as at least one reference signal to the first terminal 41b, and frequency hopping may be enabled. Hereinafter, FIGS. 6 and 7 will be described with reference to FIG. 4B, and in describing FIG. 6, description which is the same as or similar to the description of FIG. 5 may be omitted.

Based on the high mobility of a vehicle, a channel state may quickly vary in V2X. Therefore, information measured from an initially received subband SRS may not be valid after an SRS is received in a total wideband. Therefore, the first terminal 41b may estimate a wideband channel based on interpolation/extrapolation and an N number of recent SRS receptions, instead of estimating a channel state based on a received SRS in a total wideband. For example, the first terminal 41b may estimate a wideband channel by applying interpolation and extrapolation to two recently received subband SRSs SB1-2 and SB2-2 as illustrated in FIG. 6, instead of four sequentially received subband SRSs SB1-1, SB2-1, SB1-2, and SB2-2 as described above with reference to FIG. 5.

In some embodiments, the first terminal 41b may determine N based on a transmission period of an SRS and/or the degree of variation of a channel. Referring to FIG. 7, an SRS bandwidth configuration table of Document 2 may define a frequency hopping pattern, and in this case, N may be $N_{b\_hop+1}$ or more ($N \geq N_{b\_hop+1}$). That is, when $N=N_{b\_hop+1}$, a total SRS band may be covered based on fewest SRS subband transmissions, and thus, extrapolation may be minimized. For example, when b_hop=0, $C_{SRS}$=4, and $B_{SRS}$=2 (i.e., when an SRS bandwidth is 16RB and an SRS subband is 4RB) in a table of FIG. 7, as illustrated in FIG. 6, a total SRS bandwidth may be covered based on at least 2 SRS subband transmissions ($N_2$=2). In some embodiments, in a case where the uniform channel estimation of a wideband SRS is expected, when k=$b_{hop}$+1, $b_{hop}$+2 . . . ($B_{SRS}$−1), N may be determined to be $\Pi_{i=k}^{B_{SRS}} N_i$.

In some embodiments, N may be set in the first terminal 41b, or a base station may set N and command the first terminal 41b to set N. Therefore, the first terminal 41b may decrease a time taken in estimating a channel state based on an SRS. In the CSI feedback scheme of FIG. 4A, when at least one reference signal includes an SRS and frequency hopping is enabled, N may be set similar to the channel reciprocity scheme of FIG. 4B, and thus, the second terminal 42a of FIG. 4A may reduce a time taken in generating CSI based on an SRS, and a time at which CSI is fed back (or reported) (e.g. a period or an offset in a periodic feedback) may be more freely set.

Similarly to the above description, decimation of a reference signal may be defined. For example, when the number of subband SRS transmissions corresponding to a total wideband is K, a channel state of a total wideband may be estimated by ⌈K/D⌉ number of SRS transmissions (N=⌈K/D⌉), and in this case, D may be a decimation factor. In some embodiments, when k=$b_{hop}$+1, $b_{hop}$+2 . . . $B_{SRS}$, D may be $\Pi_{i=k}^{B_{SRS}} N_i$, and a maximum value of D may occur when k=$b_{hop}$+1.

In some embodiments, an SRS may be aperiodically transmitted. V2X may have a channel which is relatively limited, and the periodic transmission of an SRS may cause a high overhead. Therefore, an aperiodic SRS may be applied in V2X. For example, the first terminal 41b of FIG. 4B may command the second terminal 42b to transmit an SRS through a PSCCH, and the first terminal 41a of FIG. 4A may inform the second terminal 42a of the transmission of an SRS along with an aperiodic CSI trigger, and thus, may command the second terminal 42a to measure a reference signal.

In some embodiments, frequency hopping may occur in one slot and/or one sub-frame. For example, an intra-slot/sub-frame SRS frequency hopping may be applied in V2X, and thus, an SRS with frequency hopping applied thereto may be transmitted for a relatively short time, whereby a wideband channel may be more accurately and quickly estimated.

In some embodiments, SRS repetition may be used, and thus, a channel state may be more accurately estimated. For example, in V2X, the same SRS may be transmitted through a plurality of OFDM symbols with respect to a time axis, and the second terminal 42a of FIG. 4A and/or the first terminal 41b of FIG. 4B may measure SRSs which are repeatedly received, and thus, may more accurately estimate a channel state.

Figure 8A:
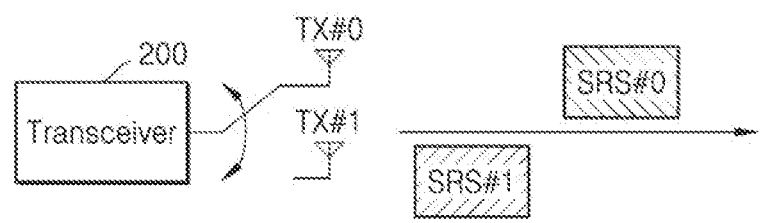
FIGS. 8A and 8B are diagrams illustrating an example of antenna switching in reference signal transmission, according to an example embodiment.
Figure 8B:
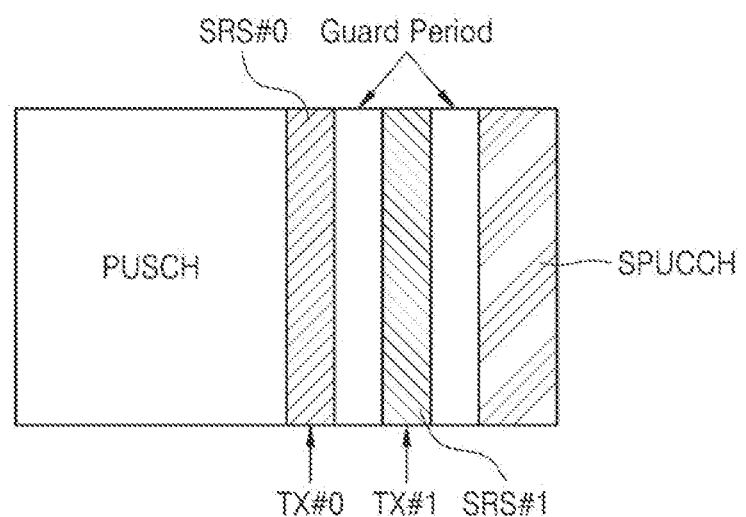
Figures 9, 10:
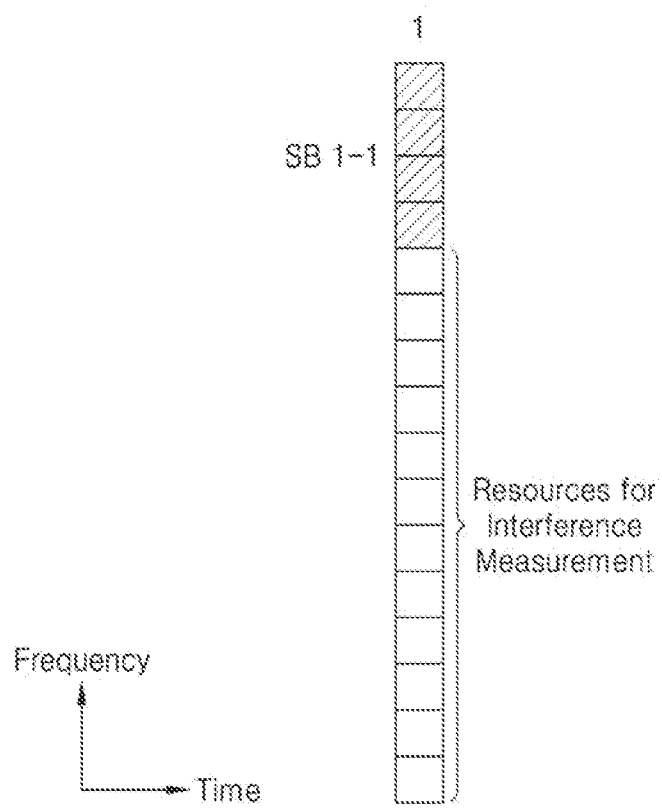
FIG. 9 is a diagram showing a guard period table according to an example embodiment.
FIG. 10 is a diagram illustrating an example of channel estimation based on interference measurement, according to an example embodiment.

FIGS. 8A and 8B are diagrams illustrating an example of antenna switching in reference signal transmission, according to an example embodiment, and FIG. 9 is a diagram showing a guard period table according to an example embodiment. In detail, FIGS. 8A and 8B illustrate an example of antenna switching in SRS transmission, and FIG. 9 is a table showing a minimum guard period GP between two SRS resources of an SRS resource set for antenna switching ("3GPP TS 38.214, NR; Physical layer procedures for data (Release 16)" (hereafter "Document 4"). In some embodiments, the second terminal 42b of FIG. 4B may transmit an SRS to the first terminal 41b based on antenna switching. Hereinafter, FIGS. 8A, 8B, and 9 will be described with reference to FIG. 4B.

In some embodiments, antenna switching may be applied to the transmission of a reference signal, and thus, a channel state may be more accurately estimated. For example, in a time division duplex (TDD) channel, the second terminal 42b may include a limited number of transceiver units TXRU, and thus, the second terminal 42b may include more RX antenna ports than the number of TX antenna ports. In this case, a state of a channel (e.g., an uplink channel) estimated based on SRS transmission performed through the TX antenna ports of the second terminal 42b may not accurately reflect a state of a channel which occurs in reception performed through the RX antenna ports of the second terminal 42b, and thus, the accuracy of estimating a channel state based on channel reciprocity may be reduced.

The second terminal 42b may perform antenna switching so that TX antenna ports may cover RX antenna ports (e.g., all RX antenna ports) in SRS transmission, and thus, a channel state may be more accurately estimated based on channel reciprocity. For example, as illustrated in FIG. 8A, the second terminal 42b may include a transceiver 200, and the second terminal 42b may include one TX antenna port and two RX antenna ports. SRS #1 may be transmitted through an antenna port TX #1, and then, antenna switching may be performed and SRS #0 may be transmitted through an antenna port TX #0. Therefore, as illustrated in FIG. 8B, the first terminal 41b may sequentially receive SRS #0, SRS #1, and a short physical uplink control channel (SPUCCH) through a PUSCH, and a guard period GP may be inserted between the SRS #0, the SRS #1, and the SPUCCH.

In some embodiments, antenna switching may be applied to the transmission of another reference signal as well as the above-described SRS. For example, the second terminal 42b may transmit a CSI-RS as at least one reference signal to the first terminal 41b. The first terminal 41b may measure the CSI-RS received from the second terminal 42b to estimate a channel state and may transmit data to the second terminal 42b on the basis of at least one transmission parameter determined based on the estimated channel state and channel reciprocity. In the second terminal 42b, the second terminal 42b may be implemented with fewer TX antenna ports than the number of RX antenna ports, and thus, the second terminal 42b may apply antenna switching in transmitting the CSI-RS.

When antenna switching from a first CSI-RS port group to a second CSI-RS port group is performed in transmitting the CSI-RS, the CSI-RS port group and the second CSI-RS port group may be defined in different symbols. For example, when the second terminal 42b is implemented with T number of TX antenna ports and R number of RX antenna ports (where T<R, and T and R are integers of more than 1), the second terminal 42b may perform antenna switching based on a CSI-RS resource defined as described below.

1) One CSI-RS resource set where R/T number of CSI-RS resources of T number of ports is provided in different R/T number of symbols
2) One CSI-RS resource where a frequency domain code division multiplexing (FD-CDM) group having a length T is provided in the different R/T number of symbols The second terminal 42b may measure an aggregated channel instead of deriving a CSI-RS resource index (CRI), in association with the CSI-RS resources included in the CSI-RS resource set of the item 1).

In some embodiments, the first terminal 41b may provide the second terminal 42b with an indicator which indicates antenna switching for a CSI-RS resource and/or a CSI-RS resource set, and thus, a corresponding CSI-RS resource and/or CSI-RS resource set may be differentiated from a CSI-RS resource set for beam management or hybrid beamforming.

In some embodiments, in a case where the second terminal 42b transmits a CSI-RS, a time gap for antenna switching may be inserted, and the second terminal 42b may not transmit any information (e.g., signals, reference signals, control and data information, etc.) during the time gap. For example, in the item 1), a time gap may be inserted between two CSI-RS resources, and in the item 2), a time gap may be inserted between two CSI-RS CDM groups. In some embodiments, a time gap may be defined and set by symbol units and may be set based on subcarrier spacing. For example, in Document 4, the table of FIG. 9 defining a minimum guard period between two SRS resources may be applied to an operation of setting a time gap.

FIG. 10 is a diagram illustrating an example of channel estimation based on interference measurement, according to an example embodiment. In detail, FIG. 10 illustrates an example which estimates a channel state based on an SRS with frequency hopping applied thereto. In some embodiments, the second terminal 42a of FIG. 4A and/or the first terminal 41b of FIG. 4B may more accurately measure a channel state on the basis interference as well as at least one reference signal received from a counterpart terminal. Hereinafter, FIG. 10 will be described with reference to FIGS. 4A and 4B.

In order for the second terminal 42a of FIG. 4A and/or the first terminal 41b of FIG. 4B to measure interference, at least one of resources below as well as at least one reference signal received from a third party terminal may be additionally set and used.

CSI-IM (CSI-Interference Measurement)(or blank-RE scheme)
NZP (Non-Zero Power) CSI-RS for interference measurement
SRS for interference measurement
AGC training signal
P-SSS, S-SSS For example, the CSI-IM may be used for measuring inter-cell interference and/or inter-terminal interference, and thus, estimation of a channel state performed by the second terminal 42a of FIG. 4A and/or the first terminal 41b of FIG. 4B may be more accurate.

In some embodiments, in a case where the CSI-IM or the blank-RE scheme similar thereto is applied, more resource elements than a 4-port CSI-RS pattern of the CSI-IM (e.g., all of one symbol period) may be set and used for more accurately measuring interference. To this end, the CSI-IM may be set based on at least one CSI-IM symbol index. Unlike a base station, symbol-level rate matching at an arbitrary position in a terminal may be limited, and thus, the CSI-IM in D2D communication may be limited to a position of a first symbol and/or a last symbol of an area where a shared channel is set. Therefore, at least one CSI-IM symbol index may be simplified as indicating at least one of a first symbol and a last symbol.

In some embodiments, the second terminal 42a of FIG. 4A and/or the first terminal 41b of FIG. 4B may regard, as interference, a portion other than at least one reference signal received from a counterpart terminal. For example, a separate resource for interference measurement may not be set in D2D communication, and thus, the second terminal 42a of FIG. 4A and/or the first terminal 41b of FIG. 4B may regard, as interference, a portion other than at least one reference signal received from a counterpart terminal (i.e., the first terminal 41a of FIG. 4A and/or the second terminal 42b of FIG. 4B), for measuring interference by using an NZP signal (e.g., a CSI-RS and an SRS) which is set for estimating a channel state.

In some embodiments, the second terminal 42a of FIG. 4A and/or the first terminal 41b of FIG. 4B may measure interference in wireless resources where at least one reference signal is not transmitted. For example, in a case where an SRS is received based on a frequency hopping pattern used for estimating a channel state, the second terminal 42a of FIG. 4A and/or the first terminal 41b of FIG. 4B may measure interference in a frequency domain where an SRS is not transmitted. As illustrated in FIG. 10, when a subband SRS SB1-1 corresponding to sizes of four resource elements RE in a wideband corresponding to sizes of sixteen resource elements RE is received, the second terminal 42a of FIG. 4A and/or the first terminal 41b of FIG. 4B may measure interference in the other twelve resource elements RE.

The second terminal 42a of FIG. 4A and/or the first terminal 41b of FIG. 4B may estimate a channel state based on channel and/or interference measurement. For example, the second terminal 42a of FIG. 4A and/or the first terminal 41b of FIG. 4B may determine an RI and/or a PMI based on channel and/or interference measurement. Also, the second terminal 42a of FIG. 4A and/or the first terminal 41b of FIG. 4B may determine an optimal CQI based on channel and/or interference measurement, and for example, may determine the CQI based on a capacity based on channel measurement and interference measurement or a channel state criteria which well represents the capacity.

FIGS. 11A and 11B show examples of a table referred to determining a transmission parameter, according to example embodiments. In detail, FIG. 11A shows a modulation order, a transmission block size (TBS), and a redundancy version table for a physical uplink shared channel (PUSCH), and FIG. 11B shows a modulation coding scheme (MCS) index table for an NR physical downlink shared channel (PDSCH) (NR PDSCH) and a PUSCH. In some embodiments, the first terminal 41a of FIG. 4A and/or the first terminal 41b of FIG. 4B may determine at least one transmission parameter with reference to the table of FIG. 11A and/or the table of FIG. 11B. Hereinafter, FIGS. 11A and 11B will be described with reference to FIGS. 4A and 4B.

An MCS may denote information which includes a code rate and a modulation order used for data encoding and mapping. The first terminal 41a of FIG. 4A and/or the first terminal 41b of FIG. 4B may determine an MCS index with reference to the table of FIG. 11A and/or the table of FIG. 11B. For example, the first terminal 41a of FIG. 4A and/or the first terminal 41b of FIG. 4B may determine an MCS index corresponding to a modulation order, a TBS index, and a redundancy version each used to transmit data, with reference to the table of FIG. 11A. Also, the first terminal 41a of FIG. 4A and/or the first terminal 41b of FIG. 4B may determine an MCS index corresponding to a modulation order, a code rate, and spectral efficiency each used to transmit data, with reference to the table of FIG. 11B. As described above with reference to FIGS. 4A and 4B, the first terminal 41a of FIG. 4A and/or the first terminal 41b of FIG. 4B may provide the determined MCS index as a transmission parameter to the second terminal 42a of FIG. 4A and/or the second terminal 42b of FIG. 4B. The table of FIG. 11A may be predefined in LTE ("3GPP TS 36.213, LTE; Evolved Universal Terrestrial Radio Access (E-UTRA); Physical layer procedures" (hereafter "Document 5"), and the table of FIG. 11B may be predefined in NR ("3GPP TS 38.214, NR; Physical layer procedures for data" (hereafter "Document 6").

FIG. 12 shows examples of a table referred to determining a transmission parameter, according to an example embodiment. In detail, a left region of FIG. 12 shows a 4-bit CQI table for NR, and a right region of FIG. 12 shows an MCS index table for an NR PDSCH and a PUSCH. In some embodiments, the first terminal 41a of FIG. 4A and/or the first terminal 41b of FIG. 4B may determine at least one transmission parameter with reference to the tables of FIG. 12. Hereinafter, FIG. 12 will be described with reference to FIGS. 4A and 4B, and a rank may denote the number of layers with transmitted data mapped thereto or may denote the number of layers in LTE and NR.

In the CSI feedback scheme described above with reference to FIG. 4A, the first terminal 41a may determine a time/frequency resource and transmission parameters for data transmission based on CSI reported from the second terminal 42a. For example, the first terminal 41a may trust an RI and/or a PMI reported from the second terminal 42a and may determine an MCS corresponding the CQI reported from the second terminal 42a.

In some embodiments, the first terminal 41a may determine a final MCS index based on a CQI index and MCS index pair corresponding to the same code rate and/or spectral efficiency. For example, the first terminal 41a may obtain a code rate and/or spectral efficiency corresponding to the CQI index reported from the second terminal 42a in the CQI table shown in the left region of FIG. 12 and may determine an MCS index corresponding to the obtained code rate and/or spectral efficiency in the MCS table shown in the right region of FIG. 12. Therefore, as illustrated as an arrow in in FIG. 12, when a CQI index corresponds to each of 2, 7, and 10, the first terminal 41a may determine an MCS index corresponding to each of 0, 11, and 18. In some embodiments, when the CQI index is 0 or 1, namely, when a channel state is very poor, the first terminal 41a may omit data scheduling for transmission of data to the second terminal 42a until the channel state is good and may determine the MCS index as 1. Although the tables of FIG. 12 are tables for NR, it may be understood that the MCS index is determined in LTE, similarly to the above description. However, in LTE, a code rate and/or spectral efficiency calculated based on a TBS index and an allocated time/frequency resource may be used.

In some embodiments, the first terminal 41a may determine a transmission parameter further based on other factors affecting a channel state, in addition to CSI provided from the second terminal 42a. For example, the first terminal 41a may determine the MCS index further based on an arbitrary outer-loop process result (i.e., a result provided from a base station) and may determine the MCS index based on an error rate occurring in data transmission as described below. In some embodiments, the first terminal 41a may determine an initial MCS index based on the CQI and may determine an MCS offset based on other factors, and a final MCS index may be calculated as a sum of the initial MCS index and the MCS offset (MCS index=initial MCS index+MCS offset).

In some embodiments, the first terminal 41a may determine a transmission parameter based on an error history, such as a frame error rate (FER) and a block error rate (BLER) of data transmission, etc. For example, the first terminal 41a may store a history of hybrid automatic repeat request (HARQ) ACK/NACK, and when an error rate (e.g., an FER) is greater than a threshold in a history of ACK/NACK during a past certain period, the first terminal 41a may determine that the CQI provided from the second terminal 42a is inaccurate or a channel state is changed, and thus, may determine the MCS offset for adjusting the initial MCS index. In some embodiments, the first terminal 41a may determine the MCS offset based on only single ACK or NACK, for decreasing complexity and a buffer size.

In some embodiments, when it is assumed that HARQ is not applied, a first FER which is an FER of each transmission may be used as a criteria. For example, when the first FER is more than 0.1 (first FER>0.1), the first terminal 41a may decrease the MCS offset by $K_{offset\_step\_dec}$, and when the first FER is 0.05 or less (first FER≤0.05), the first terminal 41a may increase the MCS offset by $K_{offset\_step\_inc}$. $K_{offset\_step\_inc}$ and $K_{offset\_step\_dec}$ may respectively correspond to an increment and a decrement in the MCS offset or may be predefined (e.g., $K_{offset\_step\_inc}=K_{offset\_step\_dec}=1$), or may be set in the first terminal 41a and/or the second terminal 42a through separate signaling such as RRC. In some embodiments, $K_{offset\_step\_inc}$ and $K_{offset\_step\_dec}$ may differ. For example, when the high stability of data transmission is needed, $K_{offset\_step\_inc}$ may be less than $K_{offset\_step\_dec}$ ($K_{offset\_step\_inc}<K_{offset\_step\_dec}$) In some embodiments, in order to decrease the complexity of MCS determination, $K_{offset\_step\_inc}$ may be equal to $K_{offset\_step\_dec}$ ($K_{offset\_step\_inc}=K_{offset\_step\_dec}$).

A criteria may be predefined, or may be set through separate signaling such as RRC. When an error rate E(i) such as a BLER of a time point i is used as a criteria, the MCS offset may be determined as follows.

1) MCS offset(0)=0
2) if E(i)<e_inc
  A. MCS offset(i+1)=MCS offset(i)+$K_{offset\_step\_inc}$
3) else if E(i)>e_dec
  A. MCS offset(i+1)=MCS offset(i)-$K_{offset\_step\_dec}$ In the pseudo code, e_inc and e_dec may be thresholds compared with a criteria and may be predefined, or may be set through separate signaling such as RRC.

In some embodiments, the first terminal 41a may use a weighted sum of ACK/NACK results as a criteria, and thus, complexity in storing and calculating an error history may be reduced. For example, the error rate E(i) of the time point i may be determined as follows.

1) initial error history criteria E(0)=0.1
2) if NACK
  A. E(i+1)=E(i)*w
3) else if ACK
  A. E(i+1)=E(i)*w+(1-w)

When ACK or NACK is received from the second terminal 42a, the first terminal 41a may perform an operation expressed as the pseudo code. In the pseudo code, a weight w may be a real number between 0 and 1. Similarly to the above description, the first terminal 41a may compare the error rate E(i) with the thresholds (i.e., e_inc and e_dec) and may increase or decrease the MCS offset based on a comparison result. For example, when E(i) is less than e_inc (e.g., e_inc=0.05), the first terminal 41a may increase the MCS offset by $K_{offset\_step\_inc}$, and when E(i) is greater than e_dec (e.g., e_dec=0.1), the first terminal 41a may decrease the MCS offset by $K_{offset\_step\_dec}$. Therefore, a buffer size for storing an ACK/NACK history may decrease, and moreover, the excessive sensitivity of the MCS offset to ACK or NACK may be prevented. In some embodiments, the first terminal 41a may determine a weight w based on at least one of a speed, a position, the amount of data to be transmitted, a resource pool setting, CSI, and a channel busy ratio (CBR) of the first terminal 41a and/or the second terminal 42a.

In some embodiments, the MCS offset described above may be determined by rank units. For example, the first terminal 41a may calculate a criteria in each of ranks and may calculate MCS offsets respectively corresponding to the ranks based on the calculated criteria.

In some embodiments, the first terminal 41a may transmit a CSI-RS as at least one reference signal to the second terminal 42a, and based on the CSI-RS, the second terminal 42a may feed back, to the first terminal 41a, a CQI (i.e., CQI_1) determined by assuming a rank as 1 and a CQI (i.e., CQI_2) determined by assuming a rank as 2. The first terminal 41a may determine an MCS (i.e., MCS_1) appropriate for transmission based on a rank 1 and an MCS (i.e., MCS_2) appropriate for transmission based on a rank 2 based on the CQI_1 and the CQI_2 each reported from the second terminal 42a. Therefore, the MCS_1 may be determined based on the CQI_1, and the MCS_2 may be determined based on the CQI_2.

In some embodiments, the first terminal 41a may select one rank from among the rank 1 and the rank 2 based on the MCS_1 and MCS_2 and may transmit data based on the selected rank and the determined MCS. For example, when a code rate and a modulation order each corresponding to the MCS_1 are code_rate_1 and Qm_1, the first terminal 41a may calculate a data rate rate_1 of when the rank 1 is used, as expressed in the following Equation 1.

$$rate\_1 = 1 * code\_rate\_1 * Qm\_1 \quad [\text{Equation 1}]$$

Also, when a code rate and a modulation order each corresponding to the MCS_2 are code_rate 2 and Qm_2, the first terminal 41a may calculate a data rate rate_2 of when the rank 2 is used, as expressed in the following Equation 2.

$$rate\_2 = 2 * code\_rate\_2 * Qm\_2 \quad [\text{Equation 2}]$$

The first terminal 41a may compare rate_1 of Equation 1 with rate_2 of Equation 2, and when the rate_1 is greater than the rate_2, the first terminal 41a may select the rank 1 and the MCS_1. Also, when the rate_2 is greater than the rate_1, the first terminal 41a may select the rank 2 and the MCS_2. Therefore, the first terminal 41a may compare performance of when transmission is performed based on one layer with performance of when transmission is performed based on two layers, and based on a result of the comparison, the first terminal 41a may select a transmission parameter which is relatively better.

FIGS. 13A and 13B are diagrams illustrating examples of terminals communicating with each other, according to example embodiments. In detail, FIG. 13A illustrates an example in which a second terminal 132a communicates with a first terminal 131a through a rear panel of the second terminal 132a, and FIG. 13B illustrates an example in which a second terminal 132b communicates with a first terminal 131b through a side panel of the second terminal 132b. Hereinafter, a repetitive description among descriptions of FIGS. 13A and 13B is omitted.

In V2X (particularly, V2V), the relative movement of each of a transmission terminal and a reception terminal may be simply modeled. For example, as illustrated in FIG. 13A, the first terminal 131a and the second terminal 132a may move on the same lane, and relative velocities between the first terminal 131a and the second terminal 132a may be simplified into two cases where the first terminal 131a and the second terminal 132a are closer to each other and are farther away from each other. Similarly, as illustrated in FIG. 13B, the first terminal 131b and the second terminal 132b may move on substantially the same movement path, and relative velocities between the first terminal 131b and the second terminal 132b may be simplified into two cases where the first terminal 131b and the second terminal 132b are closer to each other and are farther away from each other. When both terminals are closer to each other, a channel state may be better, and when the both terminals are farther away from each other, the channel state may be poorer. Therefore, in D2D communication, relative velocities between both terminals may be used to determine a transmission parameter. Hereinafter, examples of D2D communication based on a relative velocity will be described with reference to FIGS. 14 to 20B.

Figure 14:
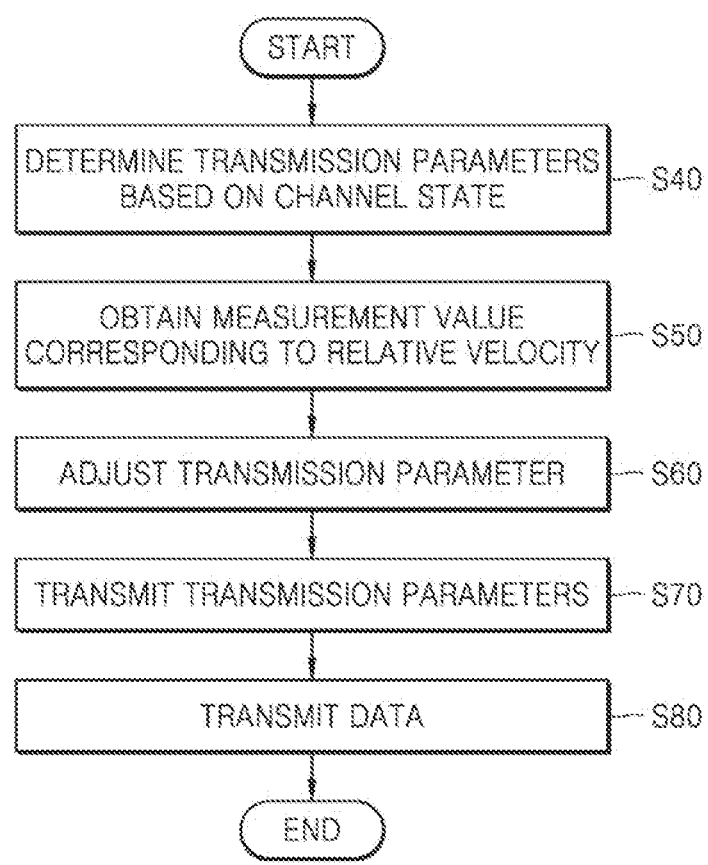
FIG. 14 is a flowchart illustrating a method of performing D2D communication, according to an example embodiment.

FIG. 14 is a flowchart illustrating a method of performing D2D communication, according to an example embodiment.

In detail, the flowchart of FIG. 14 illustrates a method of performing D2D communication based on a relative velocity between both terminals. As illustrated in FIG. 14, a method of performing D2D communication may include operations S40, S50, S60, S70, and S80. In some embodiments, the method of FIG. 14 may be performed by the first terminal 41a of FIG. 4A and/or the first terminal 41b of FIG. 4B. Hereinafter, FIG. 14 will be described with reference to FIGS. 4A and 4B.

In operation S40, an operation of determining transmission parameters based on a channel state may be performed. For example, the first terminal 41a of FIG. 4A may estimate a channel state based on CSI provided from the second terminal 42a and may determine transmission parameters based on the estimated channel state. Also, the first terminal 41b of FIG. 4B may measure at least one reference signal received from the second terminal 42b to estimate a channel state and may determine transmission parameters based on the estimated channel state.

In operation S50, an operation of obtaining a measurement value corresponding to a relative velocity may be performed. For example, the first terminal 41a of FIG. 4A may identify a relative velocity from a measurement value provided from the second terminal 42a, or may calculate a relative velocity based on a value provided from the second terminal 42a. Also, the first terminal 41b of FIG. 4B may measure at least one reference signal received from the second terminal 42b to directly obtain a measurement value corresponding to a relative velocity.

In operation S60, an operation of adjusting a transmission parameter may be performed. For example, the first terminal 41a of FIG. 4A and/or the first terminal 41b of FIG. 4B may adjust at least one of the transmission parameters which are determined in operation S40, based on the measurement value which is obtained in operation S50. When both terminals are closer to each other, namely, when negative a relative velocity between the first and second terminals is detected, at least one transmission parameter may be adjusted to correspond to a relatively high data rate, and when the both terminals are farther away from each other, namely, when a positive relative velocity between the first and second terminals is detected, at least one transmission parameter may be adjusted to correspond to a relatively low data rate. As described above, optimal transmission parameters may be determined by using a change in a channel state based on a relative velocity as well as an estimated channel state, and thus, D2D communication may be performed efficiently.

In operation S70, an operation of transmitting the transmission parameters may be performed. For example, the first terminal 41a of FIG. 4A and/or the first terminal 41b of FIG. 4B may transmit parameters, including at least one transmission parameter obtained through the adjustment in operation S60, to the second terminal 42a of FIG. 4A and/or the second terminal 42b of FIG. 4B.

In operation S80, an operation of transmitting data may be performed. For example, the first terminal 41a of FIG. 4A and/or the first terminal 41b of FIG. 4B may transmit data to the second terminal 42a of FIG. 4A and/or the second terminal 42b of FIG. 4B based on the transmission parameters which are transmitted in operation S70.

Figure 15A:
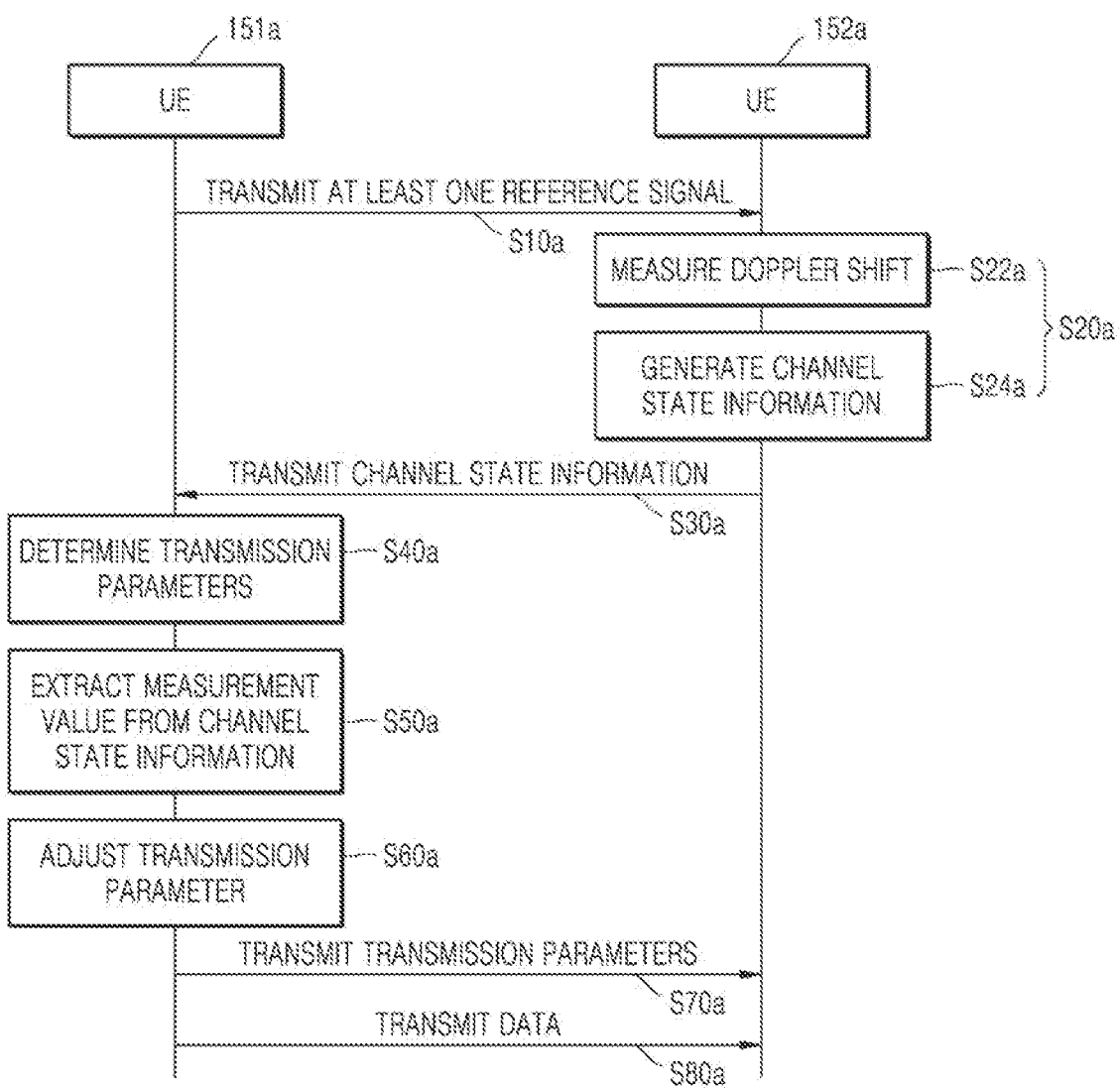
FIGS. 15A and 15B are flowcharts illustrating examples of a method of performing D2D communication, according to example embodiments.
Figure 15B:
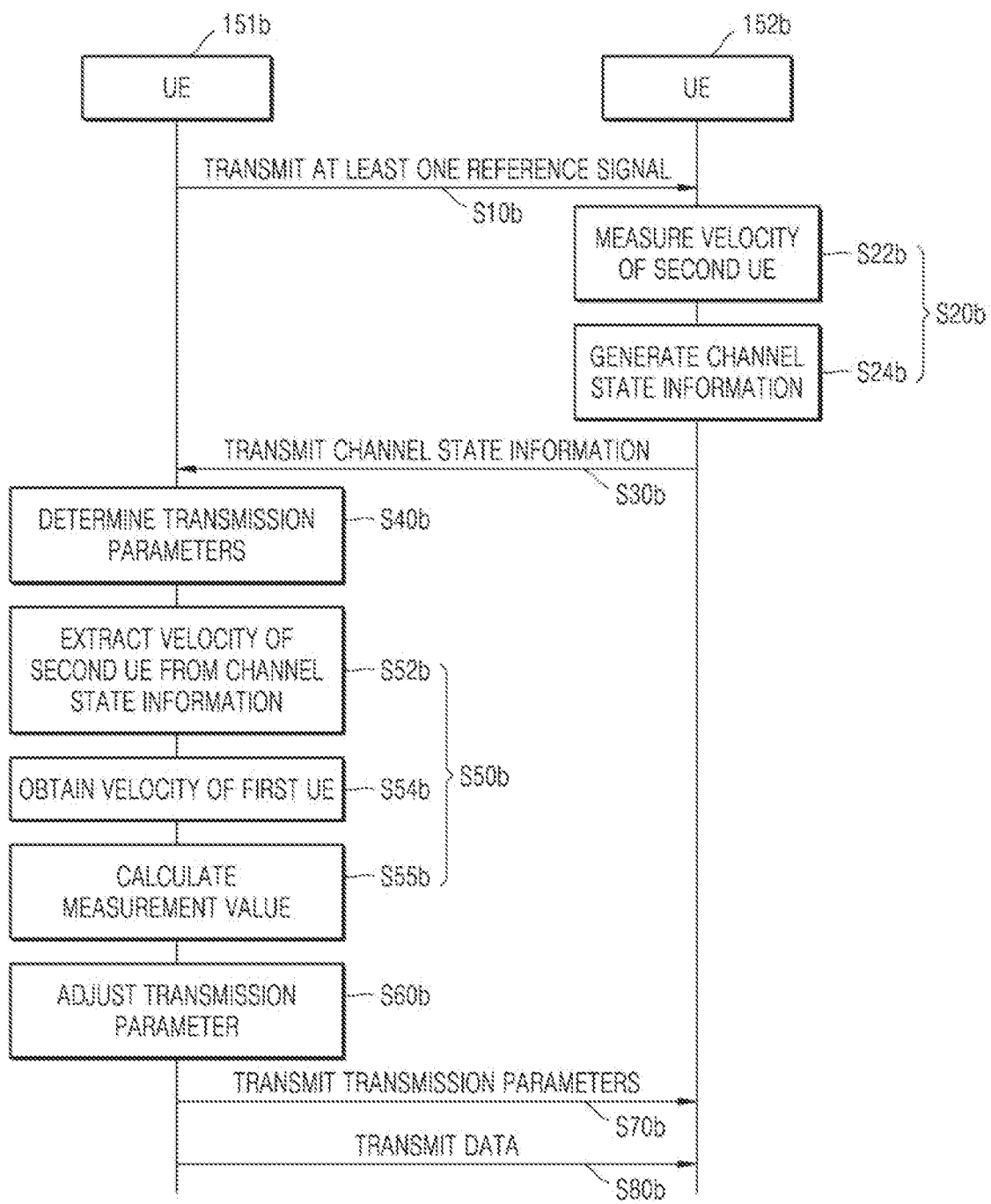

FIGS. 15A and 15B are flowcharts illustrating examples of a method of performing D2D communication, according to example embodiments. In detail, the flowcharts of FIGS. 15A and 15B represent D2D communication based on a relative velocity in a CSI feedback scheme. Hereinafter, a repetitive description among descriptions of FIGS. 15A and 15B is omitted. In FIGS. 15A and 15B, a terminal may be referred to as user equipment (UE).

Referring to FIG. 15A, in operation S10a, first UE 151a may transmit at least one reference signal to second UE 152a. In some embodiments, the first UE 151a may transmit, to the second UE 152a, a reference signal for measuring Doppler shift as well as estimate a channel state by using the second UE 152a. For example, the first UE 151a may transmit a synchronization signal, a DL DMRS, a DL CSI-RS, a PT-RS, and a tracking reference signal (TRS) to the second UE 152a.

Operation S20a may include operation S22a and operation S24a. In operation S22a, the second UE 152a may measure the Doppler shift from the at least one reference signal. For example, the second UE 152a may measure the Doppler shift based on a synchronization signal, a TRS, a PT-RS, a DMRS, and a CSI-RS. In operation S24a, the second UE 152a may generate CSI. For example, the second UE 152a may measure at least one reference signal received from the first terminal 151a to estimate a channel state and may generate CSI based on the estimated channel state. Also, the second UE 152a may generate the CSI including a measurement value corresponding to the Doppler shift which is measured in operation S22a. In operation S30a subsequent thereto, the second UE 152a may transmit the CSI to the first UE 151a.

In operation S40a, the first UE 151a may determine transmission parameters. For example, the first UE 151a may determine the transmission parameters based on the CSI received from the second UE 152a. In operation S50a, the first UE 151a may extract a measurement value from the CSI. Therefore, the first UE 151a may identify the Doppler shift measured in the second UE 152a, and thus, may detect a relative velocity between the first UE 151a and the second UE 152a.

In operation S60a, the first UE 151a may adjust at least one transmission parameter based on the detected relative velocity. For example, the first UE 151a may calculate an MCS offset described above with reference to FIGS. 4A and 4B based on the detected relative velocity and may change hysteresis used to adjust an MCS. Herein, a measurement value which corresponds to the detected relative velocity and is used to adjust the MCS index may be referred to as a channel quality offset index (CQOI).

In some embodiments, the first UE 151a may determine the MCS offset based on the CQOI as follows.

1) if $E(i)<e\_inc$
   A. MCS offset$(i+1)$=MCS offset$(i)$+$K_{offset\_step\_inc}$+$\alpha \cdot$CQOI 2) else if $E(i)>e\_dec$
   A. MCS offset$(i+1)$=MCS offset$(i)$−$K_{offset\_step\_dec}$+$\beta \cdot$CQOI In the pseudo code, α and β may be the same or may differ.

In some embodiments, the first UE 151a may adjust threshold values used to determine the MCS offset, based on the CQOI. For example, the first UE 151a may adjust threshold values as follows and may compare e_inc' and e_dec' with an error rate $E(i)$.

$e\_inc'=e\_inc+\alpha' \cdot CQOI$ $e\_dec'=e\_dec+\beta' \cdot CQOI$

In the pseudo code, α' and β' may be the same or may differ.

In some embodiments, the first UE 151a may adjust at least one transmission parameter based on at least one reference signal received from other UE. For example, the first UE 151*a* may measure a DMRS received from UE differing from the second UE 152*a*. Before transmitting data to the second UE 152*a*, the first UE 151*a* may observe a DMRS transmitted by other UE so as to determine whether the other UE occupies and uses a resource, based on a scheme similar to listen before talk (LBT). The first UE 151*a* may measure intensity and energy of a signal based on a received DMRS and may determine whether a resource (or a channel) is occupied. Although a resource is occupied by other UE or transmission of data by the other UE is performed, the first UE 151*a* may transmit data to the second UE 152*a* while the first UE 151*a* may assume a result, obtained by measuring the DMRS received from the other UE, as interference. That is, the first UE 151*a* may calculate a new signal to interference-plus-noise ratio (SINR) based on interference and may adjust at least one transmission parameter (e.g., an MCS index) based on the calculated SINR.

In operation S70*a*, the first UE 151*a* may transmit transmission parameters, including the adjusted at least one transmission parameter, to the second UE 152*a*, and in operation S80*a*, the first UE 151*a* may transmit data to the second UE 152*a*.

Referring to FIG. 15B, in operation S10*b*, a first UE 151*b* may transmit at least one reference signal to a second UE 152*b*. For example, the first UE 151*b* may transmit, to the second UE 152*b*, at least one reference signal for estimation of a channel state by the second UE 152*b*.

Operation S20*b* may include operation S22*b* and operation S24*b*. In operation S22*b*, the second UE 152*b* may obtain a velocity of the second UE 152*b*. For example, the second UE 152*b* may include a velocity sensor, a global positioning system (GPS) sensor, and/or the like and may obtain a velocity thereof from at least one sensor. In operation S24*b*, the second UE 152*b* may generate CSI. For example, the second UE 152*b* may generate CSI including a measurement value, corresponding to a velocity of the second UE 152*b* obtained in operation S22*b*, as well as an estimated channel state estimated by measuring at least one reference signal. Subsequently, the second UE 152*b* may transmit the CSI to the first UE 151*b*. In some embodiments, the second UE 152*b* may provide the first UE 151*b* with a value corresponding to a velocity thereof independently from the CSI.

In operation S40*b*, the first UE 151*b* may determine transmission parameters based on the CSI received from the second UE 152*b*. In operation S50*b*, the first UE 151*b* may obtain a measurement value corresponding to a relative velocity, and as illustrated in FIG. 15B, operation S50*b* may include operations S52*b*, S54*b*, and S55*b*. In operation S52*b*, the first UE 151*b* may extract a velocity of the second UE 152*b* from the CSI. Also, in operation S54*b*, the first UE 151*b* may obtain a velocity of the first UE 151*b*. For example, the first UE 151*b* may include a velocity sensor, a GPS sensor, and/or the like and may obtain a velocity thereof from at least one sensor. In operation S55*b*, the first UE 151*b* may calculate a measurement value corresponding to a relative velocity. For example, the first UE 151*b* may calculate the measurement value corresponding to the relative velocity based on the velocity of the first UE 151*b* and the velocity of the second UE 152*b*. In operation S60*b*, the first UE 151*b* may adjust at least one transmission parameter based on a detected relative velocity. In operation S70*b*, the first UE 151*b* may transmit transmission parameters, including the adjusted at least one transmission parameter, to the second UE 152*b*, and in operation S80*b*, the first UE 151*b* may transmit data to the second UE 152*b*.

FIGS. 16A, 16B, and 17 are flowcharts illustrating examples of a table referred to reporting CSI, according to example embodiments. In detail, FIGS. 16A and 16B show tables referred to in NR, and FIG. 17 shows a table referred to in LTE. In some embodiments, the second terminal 42*a* of FIG. 4A may feed back CSI to the first terminal 41*a* with reference to the tables of FIGS. 16A, 16B, and 17, and the second terminal 42*a* may derive CSI based on a channel $\hat{H}$ estimated based on at least one reference signal received from the first terminal 41*a*. Hereinafter, FIGS. 16A, 16B, and 17 will be described with reference to FIG. 4A.

In some embodiments, the first terminal 41*a* and the second terminal 42*a* may transmit and receive data therebetween based on an uplink data transmission scheme, and the second terminal 42*a* may report CSI with reference to an uplink codebook. For example, the first terminal 41*a* (or a base station) may set a codebook, which is to be used to feed back CSI, as an uplink codebook in the second terminal 42*a* through signaling such as RRC. Also, in an aperiodic CSI trigger, the first terminal 41*a* may set a codebook, which is to be used to feed back CSI, as an uplink codebook in the second terminal 42*a* by using an indicator included in downlink control information (DCI). An operation of setting a codebook may be performed by a base station or the first terminal 41*a* transmitting data to the second terminal 42*a*, or may be performed by a base station (e.g., 15 of FIG. 1) which controls data transmission/reception between the first terminal 41*a* and the second terminal 42*a*.

In some embodiments, a CQI and an RI each corresponding to a portion of CSI may be differently determined based on the feedback or not of PMI as follows.

When the number of TX antenna ports of the first terminal 41*a* is one, the second terminal 42*a* may assume a 1TX scheme to calculate a CQI and/or an RI and may report the calculated CQI and/or the RI to the first terminal 41*a*. Also, the second terminal 42*a* may not report the PMI and/or the RI.

When the number of TX antenna ports of the first terminal 41*a* is two or more and a PMI is not reported, the second terminal 42*a* may calculate the CQI and/or the RI based on being defined by a wireless communication system under a condition where there is no PMI and may report the calculated CQI and/or RI to the first terminal 41*a*. For example, the second terminal 42*a* may assume "TM-related CSI assumption and without PMI reporting" in LTE and may assume "non-PMI-port Selection scheme" in NR.

In some embodiments, in a case where only CSI (e.g., a CQI or an RI/CQI) other than a PMI is fed back, the second terminal 42*a* may assume a TX diversity scheme and may calculate an RI and/or a CQI. Therefore, the second terminal 42*a* may enable the first terminal 41*a* to more robustly transmit data, despite a V2X channel being quickly changed. For example, the second terminal 42*a* may assume a diversity scheme using different transmission schemes and/or a precoder based on a configuration of each of the first terminal 41*a* and the second terminal 42*a* (e.g., the number of TX antenna ports, NR/LTE, a transmission mode for LTE, and change precoding on/off for NR), and based thereon, the second terminal 42*a* may calculate a CQI. In this case, in precoder cycling, data may be transmitted by using different precoding for each frequency/time of a predefined unit (e.g., PRG) in a codebook. A precoder index may be selected based on a frequency/time unit index.

In some embodiments, on the assumption of the diversity scheme, a CQI may be calculated based on precoder cycling which uses a codebook corresponding to the number of TX antenna ports of the first terminal 41a. For example, in NR 2TX, the uplink codebook of each of FIGS. 16A and 16B defined based on a rank in Document 3 may be used. Therefore, when a layer is 1 (layer=1), one of codebook indexes 0 to 5 may be differently selected for each frequency/time unit.

Referring to FIGS. 16A and 16B, a portion of a codebook may not use a certain antenna port. Therefore, for full-power transmission, precoder cycling may be performed based on only a precoder where a size of a precoder is 1. For example, if a rank is 1 (rank=1) and TPMI is 2 to 5 in the table of FIG. 16B, precoder cycling may be performed only when a rank is 2 (rank=2) and TPMI is 1 and 2 in the table of FIG. 16B. Therefore, as a transmission power of the first terminal 41a increases, the second terminal 42a may more accurately estimate a channel, and the demodulation performance of the second terminal 42a may be enhanced. Also, in LTE 2TX, a CQI may be calculated based on precoder cycling using the uplink codebook of FIG. 17 defined in Document 2.

In some embodiments, the second terminal 42a may report CSI with reference to a downlink codebook. For example, in NR, the second terminal 42a may calculate a CQI based on the downlink codebook (e.g., "single-panel codebook Type I DL codebook" in TX ports of 4TX or more), and due to the relatively small number of calculations, the downlink codebook may be suitable for V2X which needs the quick report of CSI. In LTE, the second terminal 42a may assume one of diversity schemes defined in LTE, instead of precoding cycling. For example, LTE may define two diversity schemes, that are space frequency block coding (SFBC) and large delay cyclic delay diversity (LD-CDD). A diversity scheme may be determined based on a transmission mode (TM) of the first terminal 41a (TM2=transmit diversity (i.e. SFBC), TM3=LD-CDD), and the first terminal 41a may designate a diversity scheme to the second terminal 42a through signaling such as RRC.

In some embodiments, a TX diversity scheme may be determined based on the number of TX antenna ports of the first terminal 41a. For example, the second terminal 42a may determine SFBC in a 2 port configuration, but in other cases, the second terminal 42a may calculate and report an RI and/or a CQI based on precoder cycling.

In some embodiments, the first terminal 41a may previously select a precoder (e.g., a precoder cycling scheme) which is to be used for data transmission and may transmit a reference signal (e.g., a DMRS, a precoded CSI-RS/SRS, etc.), to which the selected precoder is applied, to the second terminal 42a. Therefore, the degree of freedom in selecting a precoder may increase in the first terminal 41a, and the second terminal 42a may more easily generate CSI. For example, the second terminal 42a may assume an identity matrix as a precoder, and based thereon, may calculate an RI and/or a CQI.

In some embodiments, in a case where the first terminal 41a transmits a precoded reference signal, the first terminal 41a may assume that a reference signal port represents a candidate DMRS port (i.e., a data layer) in transmitting data. Therefore, the first terminal 41a may apply precoders, applied to each layer among candidate precoders, to different RS ports, and thus, may transmit a reference signal to the second terminal 42a, and the second terminal 42a may determine at least one reference signal port index to which a precoder optimally suitable for data transmission is applied and may report the determined at least one reference signal port index to the first terminal 41a. The second terminal 42a may assume that the number of reference signal ports selected and reported by the second terminal 42a is the same as the number of ranks and a channel of each of the reference signal (e.g., CSI-RS/SRS) ports selected by the second terminal 42a is used in each layer transmission. The second terminal 42a may calculate and report a CQI.

In some embodiments, in a DMRS associated with a PSBCH, as described above with reference to FIG. 4A, a bandwidth of the DMRS may be less than a bandwidth of a PSSCH, and the second terminal 42a may assume that a channel of the DMRS corresponds to the bandwidth of the PSSCH and may calculate and report a CQI.

In some embodiments, the second terminal 42a may report, instead of an RI, a rank offset indicator to the first terminal 41a. In a case where the DMRS is used as at least one reference signal, the second terminal 42a may calculate and report CSI by using the same scheme as the above-described precoded reference signal, but it may be impossible to measure a rank which is higher than a transmission rank of the DMRS. Therefore, the second terminal 42a may report a rank offset indicator, and the rank offset indicator may issue a request, to the first terminal 41a, to increase or decrease a rank corresponding to a currently received DMRS rank.

The second terminal 42a may calculate a signal to noise ratio (SNR) and/or an SINR based on the above-described assumed precoding (e.g., SFBC, LD-CDD, or precoding cycling) and may derive an optimal RI and/or CQI based on the SNR and/or the SINR and a capacity and/or a CSI criteria each corresponding thereto. In some embodiments, rank restriction and/or codebook subset restriction may be applied to the above-described codebook. For example, only some RIs and/or PMIs designated as a higher layer in a total codebook may be used to calculate and report CSI.

When the number of TX antenna ports of the first terminal 41a is two or more and a PMI is reported The second terminal 42a may derive and report an optimal RI, PMI, and/or CQI based on a codebook suitable for a configuration (e.g., the number of TX antenna ports, NR/LTE, a transmission mode for LTE, change precoding on/off for NR) of the first terminal 41a and the second terminal 42a. For example, the second terminal 42a may calculate an SNR and/or an SINR corresponding to each PR and PMI pair of a codebook and may calculate an optimal RI and PMI pair and a CQI corresponding thereto based on a capacity and/or a CSI criteria each corresponding to the calculated SNR and/or SINR. In some embodiments, data transmission may be based on uplink transmission, and thus, a PMI may be determined based on the uplink codebook defined in Document 2 and Document 3. Also, in some embodiments, rank restriction and/or codebook subset restriction may be applied to a codebook, and for example, some Ms and/or PMIs in a total codebook may not be used to calculate and report CSI.

FIGS. 18A to 18E are diagrams illustrating examples of a table referred to reporting CSI, according to example embodiments. In detail, FIGS. 18A to 18E show examples of a CQI table. In some embodiments, the second terminal 42a of FIG. 4A may feed back CSI to the first terminal 41a with reference to the tables of FIGS. 16A, 16B, and 17. Hereinafter, FIGS. 18A to 18E will be described with reference to FIG. 4A.

In some embodiments, different CQI tables (regardless of the report or not of the PMI described above with reference to FIGS. 16A, 16B, and 17) may be used based on an SNR (or SINR) range to be used in data transmission and related modulation and code rate (e.g., the use or not of repetition). For example, in a case where a modulation order and/or a code rate each corresponding to a certain level or higher are not used in V2X or an excessive data rate is not used, a CQI table where a modulation order and/or a code rate range each used in V2X are covered by a relatively high resolution may be used. Therefore, a CQI may be more accurately calculated and reported, and data transmission may be more efficiently performed.

In some embodiments, in a case where there is no separate setting in NR V2X (default), the CQI table of FIG. 18A may be used. In a case where 256QAM is used in NR V2X, a CQI table of FIG. 18B may be used, and in a case where a relatively low code rate is used, a CQI table of FIG. 18C may be used. In a case where only QPSK and 16QAM are used in LTE, a CQI table of FIG. 18D may be used. Also, in a case where data transmission based on repetition is used in LTE, a CQI table of FIG. 18E may be used.

In some embodiments, the second terminal 42a may change mapping between a CQI index of a CQI table and a CSI criteria based on difference between a reported CQI and measurement result of a PSSCH DMRS received from the first terminal 41a. For example, the second terminal 42a may calculate a DMRS criteria by using a scheme similar to the above-described CQI derivation scheme, based on an SNR and/or an SINR each measured from the PSSCH DMRS. When the calculated DMRS criteria corresponds to a throughput which is lower than a previously reported CQI, the second terminal 42a may adjust mapping between a CSI criteria and a CQI so that a lower CQI is reported. Also, when the calculated DMRS criteria corresponds to a throughput which is higher than the previously reported CQI, the second terminal 42a may adjust mapping between the CSI criteria and the CQI so that a higher CQI is reported.

In some embodiments, the second terminal 42a may adjust mapping between the CSI criteria and the CQI based on an ACK/NACK result. For example, based on an ACK/NACK result of a PSSCH, when a BLER is good (e.g., when the BLER is less than a threshold value), the second terminal 42a may report a CQI which is higher than the derived CSI criteria, and when the BLER is not good (e.g., when the BLER is greater than the threshold value), the second terminal 42a may report a CQI which is lower than the derived CSI criteria.

In some embodiments, the second terminal 42a may report CQIs corresponding to each rank so that the first terminal 41a determines a rank more accurately. At this time, the second terminal 42a may not feed back a rank. Also, in some embodiments, the second terminal 42a may calculate and report CSI for beam management. For example, CSI may include at least one CSI-RS resource index (CRI), include at least one SRS resource index (SRI) and an L1-RSRP corresponding to a CRI, include a P-SSS/S-SSS and an L1-RSRP corresponding to a CRI, or include an L1-RSRP corresponding to CRI. Also, in some embodiments, as described above with reference to FIGS. 15A and 15B, the second terminal 42a may report a CQOI to the first terminal 41a.

In some embodiments, the second terminal 42a may report the above-described CSI to the first terminal 41a through a PSSCH and/or a PSFCH. For example, the second terminal 42a may report the CSI to the first terminal 41a through the PSSCH and/or the PSFCH, and the first terminal 41a may provide the second terminal 42a with control information (e.g., DCI) for demodulation. An example embodiment, where CSI is reported through a channel differing from the PSSCH and the PSFCH, will be described below with reference to FIG. 19.

Figure 19:
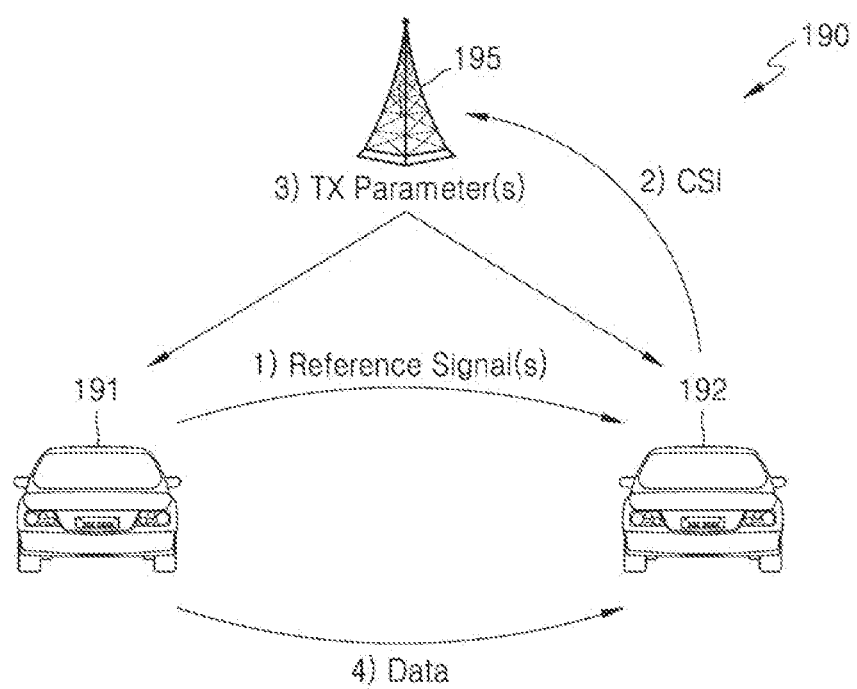
FIG. 19 is a diagram illustrating an example of CSI feedback according to an example embodiment.

FIG. 19 is a diagram illustrating an example of CSI feedback according to an example embodiment. In detail, FIG. 19 illustrates an example where CSI is reported to a base station 195 controlling sidelink data transmission.

Referring to FIG. 19, a first terminal 191 may transmit at least one reference signal to a second terminal 192, and the second terminal 192 may measure the at least one reference signal to generate CSI and may report the generated CSI to the base station 195. For example, the second terminal 192 may report the CSI to the base station 195 through a physical uplink control channel (PUCCH) and/or a physical uplink shared channel (PUSCH). The base station 195 may provide at least one transmission parameter to the first terminal 191 and the second terminal 192 based on the CSI, and the first terminal 191 may transmit data to the second terminal 192 based on the at least one transmission parameter.

In a CSI feedback scheme based on the PSSCH, the PSFCH, the PUCCH, and the PUSCH described above, periodic CSI report and/or aperiodic CSI report may be performed. For example, when periodic CSI report is applied, link adaptation may be easily performed. Also, when aperiodic CSI report is applied, the first terminal 41a of FIG. 4A and/or the base station 195 of FIG. 19 may command the second terminal 42a of FIG. 4A and/or the second terminal 192 of FIG. 19 to perform CSI report through dynamic signaling like DCI depending on the case, and thus, the CSI report may be triggered. CSI may be reported through a control channel and/or a shared channel, and in this case, a predefined resource may be used in the control channel and a resource to be used in the shared channel may be designated through dynamic signaling like DCI.

In some embodiments, in a case where CSI is reported through the shared channel such as the PSSCH or the PUSCH, subband CSI may be calculated and reported in addition to wideband CSI, and in a case where CSI is reported through a channel such as the PSFCH or the PUCCH, only wideband CSI may be reported. A payload of the PSFCH may be less than that of the PSSCH, and a resource may be more freely used in the PSSCH than the PSFCH. Therefore, subband CSI, where a payload varies based on CSI content (e.g., the number of subbands) and a large payload is needed, may be reported through the PSSCH. The report of the subband CSI may be applied to a portion (e.g., CQI) of CSI, or may be applied to all of the CSI.

In some embodiments, aperiodic CSI may be reported through the PSSCH, and periodic CSI may be reported through the PSFCH. For example, based on the dynamic control information, aperiodic CSI report may be triggered in the second terminal 42a of FIG. 4A, and a PSSCH resource for reporting CSI may be allocated. Also, in order to more flexibly adjust a CSI report time point of the second terminal 42a of FIG. 4A, the first terminal 41a of FIG. 4A may designate the CSI report time point of the second terminal 42a based on the dynamic control information such as DCI. The second terminal 42a of FIG. 4A may identify a resource based on an MCS and/or resource allocation included in control information for triggering aperiodic CSI report and may report CSI by using the identified resource.

In some embodiments, in a case where a payload size of CSI is small (e.g., a case where a CSI payload size is 1 codeword, subband CSI report is not provided, or report is not NR Type II CSI report), aperiodic CSI report may be transmitted through the PSFCH alone or multiplexed with HARQ ACK/NACK. A time/frequency resource of the PSFCH may be predefined, and thus, separate resource allocation for the aperiodic CSI report may be omitted, thereby enabling CSI feedback to be more simplified.

In some embodiments, the aperiodic CSI report may be performed along with the periodic CSI report. Also, in some embodiments, when a throughput is relatively small in V2X, the periodic CSI report may be omitted and only the aperiodic CSI report may be performed, and D2D communication may be performed based on the aperiodic CSI report. For example, in a case where periodic link adaptation is not useful because a transmission time of data is expected not to be long, an aperiodic CSI trigger may be used.

In some embodiments, based on a quickly varying channel, fast CSI feedback for V2X may be applied. For example, CIS feedback may satisfy at least some of the following conditions, and the following conditions may be set to a default in V2X without a separate setting.

Maximum port number restriction (e.g., four ports)
Maximum rank restriction (e.g., 2)
Report only wideband CSI
Omit PMI report
Use only single panel Type I codebook
Use only a single resource for channel measurement In some embodiments, although conventional CSI is divided into part 1/2 in NR, only one part (e.g., part 1) may be used in V2X. For example, a payload may not vary based on CSI content, and thus, simple CSI decoding may be performed and the aperiodic CSI report may be performed through the PSFCH.

In V2X, a terminal for performing data transmission and a terminal for performing data reception may be replaced therebetween. That is, a terminal which has transmitted first data may be a terminal receiving second data which has been transmitted by a terminal which has received the first data. In a case where transmission of data is performed in two directions between two terminals, it may be inefficient that a channel is separately reported in a data transmission direction. Accordingly, one of the two terminals may calculate and report CSI, and corresponding CSI may be used for bidirectional data transmission. For example, in FIG. 19, in a case where the second terminal 192 of the first terminal 191 and the second terminal 192 reports CSI to the first terminal 191, the first terminal 191 may transmit data to the second terminal 192 based on CSI, and the second terminal 192 may determine a transmission parameter (e.g., an MCS, an RI, and PMI) for transmitting data to the first terminal 191 based on a channel state, estimated by measuring at least one reference signal (e.g., an SRS) transmitted by the first terminal 191, and CSI corresponding thereto. Therefore, an overhead for CSI report may be more reduced than a case where both the first terminal 191 and the second terminal 192 report CSI, and a resource for transmitting a reference signal may be saved.

In some embodiments, the base station 195 may designate a terminal (e.g., "CSI-reference UE") reporting CSI among the first terminal 191 and the second terminal 192. A terminal designated as "CSI-reference UE" by the base station 195 may calculate and report CSI, and the other terminal may determine a transmission parameter (e.g., an MCS, a rank, and precoding) for data transmission with reference to CSI (without calculating and reporting CSI corresponding to a reception channel thereof). The base station 195 may explicitly designate "CSI-reference UE", or may implicitly designate "CSI-reference UE" by providing one of the two terminals with a setting for CSI report and providing the other terminal with a signal setting (e.g., a reference signal). Such CSI report may be used in a case where channel reciprocity is good and another case, such as a case where a diversity scheme is used. For example, in a case where one terminal does not support CSI report in V2X, CSI may be used in common for bidirectional channel estimation, and the terminal may inform the base station 195 of the supporting or not of CSI report through UE capability signaling. In some embodiments, a geometry-based UE group which is set for the report of HARQ ACK/NACN may be used.

In some embodiments, a terminal may report delta-CSI based on an MCS, a rank, and/or precoding each designated thereto, and thus, a CSI feedback overhead may be reduced. For example, instead of a value representing a total CQI, an index deviation corresponding to a certain CQI reference may be reported. A terminal may report only an index variation based on an MCS, an RI, and/or PMI each designated as a dynamic signal thereto, and thus, an overhead may be reduced in feedback using a channel, having a small payload, such as the PSFCH, thereby enhancing the efficiency of CSI report. In an MCS and a CQI, a CQI index corresponding to a reference may be a CQI index having the same code rate as that of an MCS designated as control information such as DCI in association with a reference resource, and a delta-CQI may be calculated and reported. Also, in aperiodic CSI, the CQI reference may be a CQI index corresponding to the same code rate as that of an MCS designated in DCI for triggering the aperiodic CSI report. Such a method may be suitable for a case where channel reciprocity is good (i.e., a case where a characteristic of an uplink channel is similar to a characteristic of a downlink channel).

Figure 20A:
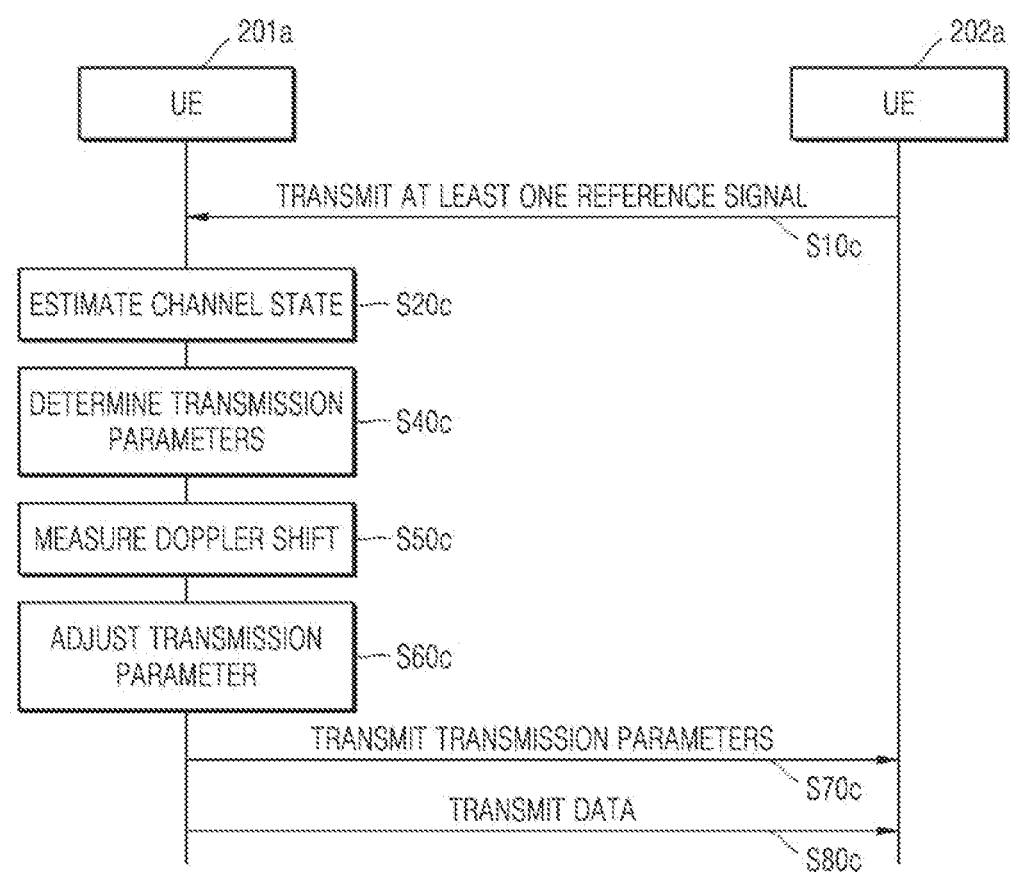
FIGS. 20A and 20B are flowcharts illustrating examples of a method of performing D2D communication, according to example embodiments.
Figure 20B:
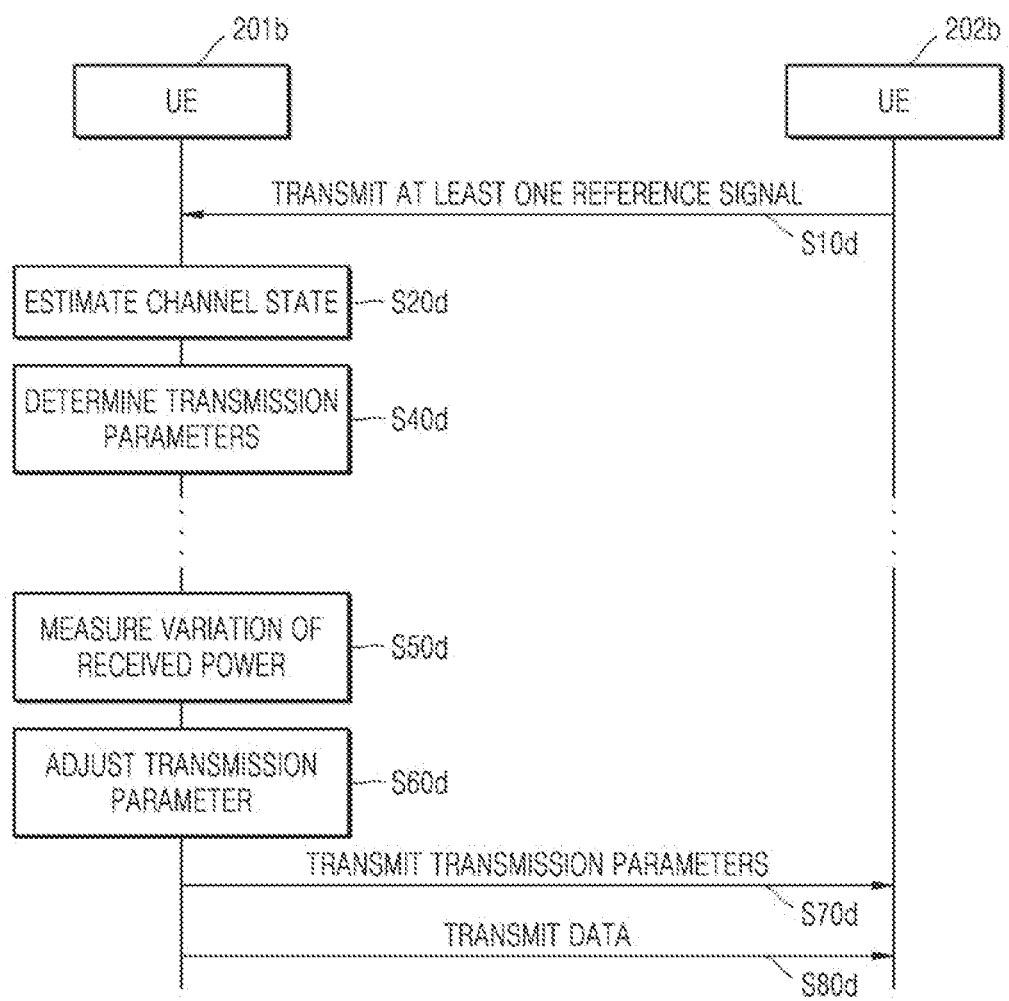

FIGS. 20A and 20B are flowcharts illustrating examples of a method of performing D2D communication, according to example embodiments. In detail, the flowcharts of FIGS. 20A and 20B illustrate D2D communication based on a relative velocity in a channel reciprocity scheme. As described above with reference to FIG. 4B, first UE 201a transmitting data may estimate a channel state without CSI feedback from second UE 202a. Hereinafter, a repetitive description among descriptions of FIGS. 20A and 20B is omitted. In FIGS. 20A and 20B, a terminal may be referred to as UE.

Referring to FIG. 20A, in operation S10c, the second UE 202a may transmit at least one reference signal to the first UE 201a. For example, the second UE 202a may transmit an CSI-RS and/or an SRS to the first UE 201a. In some embodiments, as described above with reference to FIGS. 8A, 8B, and 9, the second UE 202a may transmit the at least one reference signal based on antenna switching. For example, the first UE 201a may set an SRS resource set, including a plurality of SRS resources, in the second UE 202a and may set the second UE 202a so that antenna switching is performed in the SRS resource set. Therefore, the second UE 202a may transmit the SRS to the first UE 201a so that SRS resources are transmitted in different antenna port groups, based on a setting of the first UE 201a. Also, the second UE 202a may transmit the CSI-RS based on antenna switching and may transmit the SRS to the first UE 201a so that symbols are transmitted in different antenna port groups, based on the setting of the first UE 201a.

In operation S20c, the first UE 201a may estimate a channel state based on the at least one reference signal received from the second UE 202a. A channel, through which the first UE 201a transmits data, may be regarded as Hermitian of a channel through which the at least one reference signal is received. That is, when a channel estimated by measuring the at least one reference signal received from the second UE 202a is H̃, a channel H̃' for transmitting data may be expressed as the following Equation 3.

$$\tilde{H}' = (\tilde{H})^H \quad \text{[Equation 3]}$$

In some embodiments, when the number of RX antenna ports is equal to or greater than the number of TX antenna ports in the first UE 201a, the first UE 201a may use only a channel state (e.g., a measurement result in an antenna port corresponding to a TX antenna port) corresponding to a portion which is to be used for actual data transmission. Also, in some embodiments, when an RX bandwidth of the first UE 201a is equal to or greater than a TX bandwidth of the first UE 201a, the first UE 201a may use a channel state corresponding to only a bandwidth corresponding to a portion which is to be used for actual data transmission, and thus, the second UE 202a may more easily transmit a reference signal and may be simply implemented.

In operation S40c, the first UE 201a may determine transmission parameters. For example, the first UE 201a may determine the transmission parameters based on a channel state which is estimated in operation S20c. In operation S50c, the first UE 201a may measure Doppler shift. For example, the second UE 202a may transmit, to the first UE 201a, a reference signal for measuring Doppler shift as well as estimating a channel state. For example, the second UE 202a may transmit an SRS, a UL PT-RS, a UL DMRS and the like to the first UE 201a. The first UE 201a may measure the Doppler shift from the at least one reference signal received from the second UE 202a, and thus, may detect a relative velocity between the first UE 201a and the second UE 202a.

In operation S60c, the first UE 201a may adjust a transmission parameter based on the detected relative velocity. For example, as described above with reference to FIG. 15A, the first UE 201a may calculate an MCS offset or may change MCS hysteresis, based on the detected relative velocity. In operation S70c, the first UE 201a may transmit transmission parameters, including at least one adjusted transmission parameter, to the second UE 202a, and in operation S80c, the first UE 201a may transmit data to the second UE 202a.

Referring to FIG. 20B, in operation S10d, a second UE 202b may transmit at least one reference signal to a first UE 201b. For example, the second UE 202b may transmit, to the first UE 201b, at least one reference signal for estimating a channel state by the first UE 201b. In operation S20d, the first UE 201b may measure the at least one reference signal to estimate the channel state and may determine transmission parameters based on the channel state which is estimated in operation S40d.

In operation S50d, the first UE 201b may measure a variation of received power. For example, the first UE 201b may measure signals (e.g., a reference signal, NACK/ACK, and the received power) received from the second UE 202b and may detect relative velocities between the first UE 201b and the second UE 202b based on variations of received powers. That is, when the received power increases, the first UE 201b may determine that the second UE 202b is closer thereto, and thus, may determine that the channel state is improved. Also, when the received power decreases, the first UE 201b may determine that the second UE 202b is farther away therefrom, and thus, may determine that the channel state is degraded.

In operation S60d, the first UE 201b may adjust at least one transmission parameter based on the detected relative velocity. In operation S70d, the first UE 201b may transmit transmission parameters, including at least one adjusted transmission parameter, to the second UE 202b, and in operation S80d, the first UE 201b may transmit data to the second UE 202b.

Figure 21:
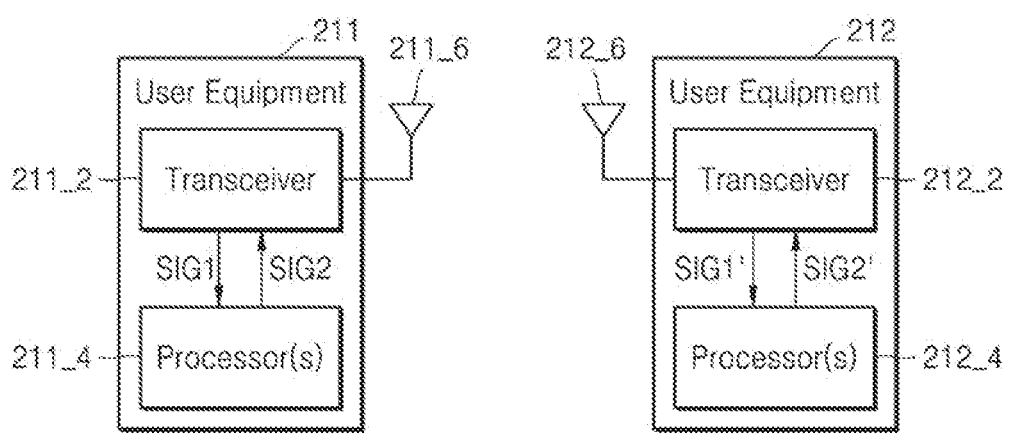
FIG. 21 is a diagram illustrating an example of terminals performing D2D communication, according to an example embodiment.

FIG. 21 is a diagram illustrating an example of terminals performing D2D communication, according to an example embodiment. As illustrated in FIG. 21, first UE 211 and second UE 212 may transmit and receive a wireless signal based on arbitrary RAT (e.g., LET, or NR). The first UE 211 may denote a terminal which transmits data in D2D communication, and the second UE 212 may denote a terminal which receives data in D2D communication. In some embodiments, the first UE 211 and/or the second UE 212 may include an arbitrary device which performs wireless communication, and for example, may include a mobile phone, a home appliance, a vehicle, a self-driving vehicle, a cross reality (XR) device, a robot, and an artificial intelligence (AI) device. Herein, the first UE 211 or at least one processor 211_4 included in the first UE 211 may be simply referred to as a first device, and the second UE 212 or at least one processor 212_4 included in the second UE 212 may be simply referred to as a second device.

The first UE 211 may include a transceiver 211_2, the at least one processor 211_4, and at least one antenna 211_6. The at least one processor 211_4 may process a first signal SIG1 provided from the transceiver 211_2 and may provide a second signal SIG2 to the transceiver 211_2. The at least one processor 211_4 may be referred to as a baseband processor, a modem, or a communication processor, and the first signal SIG1 and the second signal SIG2 may be baseband signals. The at least one processor 211_4 may perform at least some of the operations described above with reference to the drawings.

In some embodiments, the at least one processor 211_4 may be implemented as a controller, a microcontroller, or a microprocessor. The at least one processor 211_4 may be implemented as hardware, firmware, software, or a combination thereof. For example, the at least one processor 211_4 may include an application specific integrated circuit (ASIC), a digital signal processor (DSP), a digital signal processing device (DSPD), a programmable logic device (PLD), or a field programmable gate array (FPGA). At least some of the operations described above with reference to the drawings may be implemented through firmware or software, and the firmware or the software may be stored in a memory device which is included in the at least one processor 211_4 or is accessed by the at least one processor 211_4.

The transceiver 211_2 may process a radio frequency (RF) signal received through the at least one antenna 211_6 to generate the first signal SIG1 and may process the second signal SIG2 to output the RF signal through the at least one antenna 211_6. The transceiver 211_2 may include a mixer which converts the RF signal into a baseband signal and converts the baseband signal into the RF signal, and moreover, may further include an amplifier, a filter, and/or the like.

Like the first UE 211, the second UE 212 may include a transceiver 212_2, the at least one processor 212_4, and at least one antenna 212_6.

Figure 22:
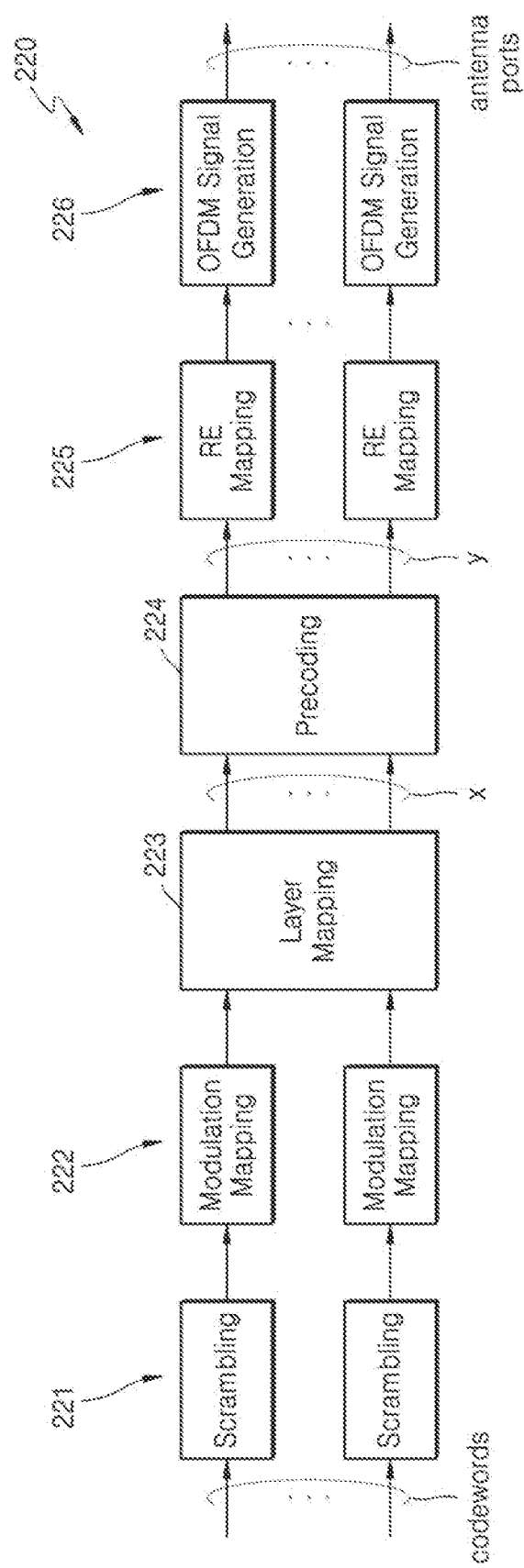
FIG. 22 is a block diagram illustrating a signal processing operation for transmission, according to an example embodiment.

FIG. 22 is a block diagram illustrating a signal processing operation for transmission, according to an example embodiment. In some embodiments, operations illustrated in FIG. 22 may be performed by the at least one processor 211_4 included in the first UE 211 of FIG. 21. Two or more of the operations illustrated in FIG. 22 are not limited to the illustration of FIG. 22 and may be combined and performed.

In a first operation 221, codewords may be scrambled. For example, coded bits may be scrambled in each of codewords which are to be transmitted through a physical channel. In a second operation 222, scrambled bits may be modulated. For example, the modulation of coded bits may be performed for generating complex-valued modulation symbols. In a third operation 223, modulated symbols may be mapped to a transmission layer. For example, complex-valued modulation symbols respectively corresponding to codewords to be transmitted may be mapped to one or more transmission layers. In a fourth operation 224, an output y may be generated by precoding an input x. For example, complex-valued modulation symbols corresponding to the input x may be precoded in each transmission layer, for transmission through antenna ports, and thus, the output y may be generated. In a fifth operation 225, modulated symbols may be mapped to resource elements. For example, complex-valued modulation symbols respectively corresponding to antenna ports may be mapped to resource elements. In a sixth operation 226, an OFDM signal may be generated. For example, a complex-valued time domain OFDM signal may be generated on each antenna port.

While example embodiments have been particularly shown and described, it will be understood that various changes in form and details may be made therein without departing from the spirit and scope of the following claims.

What is claimed is:

1. A first device configured to perform device-to-device (D2D) communication with a second device by:
    transmitting a plurality of reference signals based on frequency hopping in a wideband to the second device;
    receiving channel state information from the second device;
    determining a plurality of transmission parameters based on the channel state information;
    transmitting the plurality of transmission parameters to the second device; and
    transmitting data based on the plurality of transmission parameters to the second device,
    wherein the first device is further configured to:
        obtain at least one measurement value corresponding to a relative velocity between the first device and the second device; and
        adjust at least one transmission parameter among the plurality of transmission parameters,
        wherein the channel state information is generated, by the second device, based on interpolation or extrapolation of an N number of reference signals recently received among the plurality of reference signals.

2. The first device of claim 1, configured to obtain the at least one measurement value from the channel state information.

3. The first device of claim 2, wherein the at least one measurement value comprises a value corresponding to a Doppler shift that is measured based on the plurality of reference signals in the second device.

4. The first device of claim 1, configured to obtain the at least one measurement value by:
    obtaining a velocity of the second device from the channel state information; and
    generating the at least one measurement value based on a velocity of the first device and the velocity of the second device.

5. The first device of claim 1, configured to:
    adjust the at least one transmission parameter to correspond to a first data rate based on the at least one measurement value corresponding to a negative relative velocity between the first device and the second device; and
    adjust the at least one transmission parameter to correspond to a second data rate based on the at least one measurement value corresponding to a positive relative velocity between the first device and the second device, and
    wherein the first data rate is greater than the second data rate.

6. The first device of claim 5, configured to:
    adjust the at least one transmission parameter to correspond to the first data rate by increasing a modulation and coding scheme (MCS) index; and
    adjust the at least one transmission parameter to correspond to the second data rate by decreasing the MCS index.

7. The first device of claim 1, further configured to:
    receive an acknowledgement corresponding to the transmitting of the data, from the second device; and
    measure an error rate based on the acknowledgement,
    wherein the first device is configured to adjust the at least one transmission parameter when the error rate is less than a first threshold value or is greater than a second threshold value.

8. A second device configured to perform device-to-device (D2D) communication with a first device by:
    receiving a plurality of reference signals based on frequency hopping in a wideband from the first device;
    generating channel state information based on interpolation or extrapolation of an N number of reference signals recently received among the plurality of reference signals;
    transmitting the channel state information to the first device;
    receiving a plurality of transmission parameters and data from the first device;
    processing the data based on the plurality of transmission parameters,
    wherein the plurality of transmission parameters includes at least one transmission parameter adjusted by the first device based on a relative velocity between the first device and the second device.

9. The second device of claim 8, configured to generate the channel state information including at least one measurement value corresponding to the relative velocity.

10. The second device of claim 9, configured to:
    measure a Doppler shift based on the plurality of reference signals; and
    generate the at least one measurement value based on the Doppler shift.

11. The second device of claim 9, configured to:
    measure a variation of received power based on the plurality of reference signals; and
    generate the at least one measurement value based on the variation of received power.

12. The second device of claim 8, wherein the plurality of reference signals comprises at least one of a synchronization signal, a tracking reference signal (TRS), a phase tracking reference signal (PT-RS), a demodulation reference signal (DMRS), and a channel state information reference signal (CSI-RS).

13. The second device of claim 8, configured to generate the channel state information including a velocity of the second device.

14. A first device configured to perform device-to-device (D2D) communication with a second device, configured to:
obtain at least one measurement value corresponding to a relative velocity between the first device and the second device;
adjust at least one transmission parameter based on the at least one measurement value;
transmit a plurality of transmission parameters including the at least one transmission parameter to the second device; and
transmit data to the second device based on the plurality of transmission parameters,
wherein the first device is further configured to operate in a first mode or a second mode,
wherein, in the first mode, the first device is configured to:
receive a plurality of first reference signals from the second device;
estimate a channel state based on the plurality of first reference signals; and
determine the plurality of transmission parameters based on the channel state; and
wherein, in the second mode, the first device is configured to:
transmit at least one second reference signal to the second device;
receive channel state information from the second device corresponding to the at least one second reference signal; and
determine the plurality of transmission parameters based on the channel state information,
wherein the plurality of first reference signals are transmitted based on antenna switching between a transmitting antenna port and a receiving antenna port by the second device.

15. The first device of claim 14, wherein, in the second mode, the first device is configured to obtain the at least one measurement value from the channel state information.

16. The first device of claim 15, wherein the at least one measurement value comprises a value corresponding to a Doppler shift that is measured based on the at least one second reference signal in the second device.

17. The first device of claim 14, configured to obtain the at least one measurement value by:
obtaining a velocity of the second device, measured in the second device, from the channel state information; and
generating the at least one measurement value based on a velocity of the first device and the velocity of the second device.

18. The first device of claim 14, configured to:
adjust the at least one transmission parameter to correspond to a first data rate based on the at least one measurement value corresponding to a negative relative velocity between the first device and the second device; and
adjust the at least one transmission parameter to correspond to a second data rate based on the at least one measurement value corresponding to a positive relative velocity between the first device and the second device, and
wherein the first data rate is greater than the second data rate.

19. The first device of claim 14, further configured to:
receive an acknowledgement corresponding to the transmitting of the data, from the second device; and
measure an error rate based on the acknowledgement,
wherein the first device is configured to adjust the at least one transmission parameter when the error rate is less than a first threshold value or is greater than a second threshold value.

20. The second device of claim 8, wherein the N number is determined based on at least one of a transmission period of the plurality of reference signals and degree of variation of a channel between the first device and the second device.

* * * * *